(12) United States Patent
Pless et al.

(10) Patent No.: US 12,496,270 B2
(45) Date of Patent: Dec. 16, 2025

(54) METHODS FOR REVERSIBLE MALE BIRTH CONTROL

(71) Applicant: MTology Innovations LLC, Waddell, AZ (US)

(72) Inventors: Candace Pless, Waddell, AZ (US); Gabriella Estrada, Mesa, AZ (US)

(73) Assignee: MTology Innovations LLC, Waddell, AZ (US)

( * ) Notice: Subject to any disclaimer, the term of this patent is extended or adjusted under 35 U.S.C. 154(b) by 0 days.

(21) Appl. No.: 18/309,554

(22) Filed: Apr. 28, 2023

(65) Prior Publication Data
US 2023/0346692 A1     Nov. 2, 2023

Related U.S. Application Data

(60) Provisional application No. 63/336,219, filed on Apr. 28, 2022.

(51) Int. Cl.
*A61K 9/00*     (2006.01)
*A61K 9/08*     (2006.01)
*A61K 31/734*   (2006.01)
*A61K 47/18*    (2017.01)

(52) U.S. Cl.
CPC .............. *A61K 9/0034* (2013.01); *A61K 9/08* (2013.01); *A61K 31/734* (2013.01); *A61K 47/183* (2013.01)

(58) Field of Classification Search
CPC ...... A61K 9/0034; A61K 9/08; A61K 31/734; A61K 47/183
USPC ........................................................ 514/54
See application file for complete search history.

(56) References Cited

U.S. PATENT DOCUMENTS

| 5,488,075 A | 1/1996 | Guha |
| 2011/0002979 A1 | 1/2011 | Guha |
| 2019/0038454 A1* | 2/2019 | Eisenfrats ............ A61B 8/0841 |
| 2020/0352649 A1 | 11/2020 | Eisenfrats et al. |

FOREIGN PATENT DOCUMENTS

| WO | 2019070632 A1 | 4/2019 |
| WO | 2021243046 A1 | 12/2021 |

OTHER PUBLICATIONS

Lohiya et al, Indian J Med Res, 2014, 140 (Supplement), pp. 63-72.*
Bao et al, ACS Nano, 2019, 13, 1003-1011.*
Shkand et al, Methods Appl. Fluoresc. 2016, 4, pp. 1-12.*
Zi-Qi Wang et al., "An Ultrasound-Induced Self-Clearance Hydrogel for Male Reversible Contraception", ACS Publication—ACS Nano, Apr. 26, 2022, pp. 1-1.
"Center for Male Contraceptive Research & Development", NES/T Gel | malecontraception, https://www.malecontraception.center/nest-gel. known about as early as Apr. 28, 2022, downloaded on Apr. 28, 2023, pp. 1-2.
Contrline, "How ADAM works", Contraline Product, http://www.contraline.com/product, known about as early as Apr. 28, 2022, downloaded on Apr. 28, 2023, pp. 1-5.
P.P. Lestari et al., "Controlled Drug Delivery Carrier of Nifedipine Using Biodegradable Microcapsule Polymer from Poly (D,, L-Lactic Acid) and Polyethylene Glycol", Journal of Physics: Conference Series, 1751, 2021, pp. 1-15.
S. Liu et al., "Current applications of poly(lactic acid) composites in tissue engineering and drug delivery", Composites Part B: Engineering, vol. 199, Oct. 15, 2020, pp. 1-6.
B.K. Lee et al., "PLA Micro- and Nano-Particles", Adv Drug Deliv Rev, Dec. 2016, pp. 1-49.
"Reversible Male Birth Control", plan a, https://www.planaformen.com/, known about as early as Apr. 28, 2022, downloaded on Apr. 28, 2023, pp. 1-10.
J. Sonchaeng et al., "Poly)lactic acid) mass transfer properties", https://www.sciencedirect.com/science/article/pii/S0079670017302459. Elsevier, 2018, pp. 1-147.
N.K. Lohiya et al.,, "RISUG: An intravasal injectable male contraceptive", Indian J. Med Res 140 (Supplement), Nov. 2014, pp. 63-72.
J. Kanwar et al., "The effect of nifedipine, a calcium channel blocker, on human spermatozoal functions", Contraception vol. 48, Issue 5, Nov. 1993, pp. 453-470.
E. Budianto et al., "The influence compound variation of polyblend poly (L-lactic acid) and poly (e-caprolactone) on in vitro dissolution and efficiency test of nifedipine microencapsulation", Proceedings of the 5th International Symposium on Current Progress in Mathematics and Sciences, AIP Conference Proceedings, Jun. 2020, pp. 1-7.
PCT/US2023/066408, "Notification of Transmittal of the International Search Report and the Written Opinion of the International Searching Authority, or the Declaration", International Searching Authority, Aug. 8, 2023, pp. 1-18.
Bao et al., "A Cocktail-Inspired Male Birth Control Strategy with Physical/Chemical Dual Contraceptive Effects and Remote Self-Cleared Properties", ACS Nano. Feb. 26, 2019;13(2):1003-1011.

* cited by examiner

*Primary Examiner* — Ganapathy Krishnan
(74) *Attorney, Agent, or Firm* — Kunzler Bean & Adamson

(57) ABSTRACT

Contraceptives and methods for reversible male birth control are disclosed herein. One method includes providing a polymer including a viscosity and reducing the viscosity of the polymer to create a polymer solution. The method further includes injecting the polymer solution into the vas deferens of a male subject while the viscosity of the polymer is reduced. The polymer solution forms a polymer barrier in the vas deferens to physically block the outflow of sperm in the vas deferens subsequent to injection.

20 Claims, 30 Drawing Sheets

METHODS FOR REVERSIBLE MALE BIRTH CONTROL

REFERENCE TO RELATED APPLICATION

This application claims prior to and the benefit of U.S. Provisional Patent Application No. 63/336,219, filed on Apr. 28, 2022, the contents of which are incorporated herein by reference, in its entirety.

FIELD

The subject matter disclosed herein relates to contraceptives and, more particularly, relates to methods for reversible male birth control.

BACKGROUND

Females typically bear the majority of the financial and health-related burdens of an unplanned pregnancy and/or bear all of the financial and/or health-related burdens of contraceptives. Long-term reversible contraceptives, such as intrauterine devices (IUDs) and implantable time-released birth-control medications, have become popular methods for birth control among females. Comparable methods of male contraception do not exist, which impacts pregnancy rates across the world.

BRIEF SUMMARY

The subject matter of the present disclosure provides examples of methods for male birth control. It is desirable to develop improved methods for using polymers that can provide contraceptives for a male subject (e.g., a male human, a non-birthing human, a male animal, a non-birthing animal, etc.) and/or methods of male birth control. It is also desirable that the contraceptives for the male subject and/or the methods of male birth control be reversible. Accordingly, the subject matter of the present application has been developed in response to the present state of the art, and in particular, in response to the desire to provide contraceptives for male subjects and/or methods for reversible male birth control.

Disclosed herein are methods for male birth control. One method includes providing a polymer including a viscosity, reducing the viscosity of the polymer to create a polymer solution, and injecting the polymer solution into a vas deferens of a subject while the viscosity of the polymer is reduced to form a polymer barrier for sperm in the vas deferens subsequent to injection. The preceding subject matter of this paragraph characterizes example 1 of the present disclosure.

Providing the polymer includes providing a biocompatible polymer. The preceding subject matter of this paragraph characterizes example 2 of the present disclosure, wherein example 2 also includes the subject matter according to example 1, above.

Providing the biocompatible polymer includes providing a polysaccharide. The preceding subject matter of this paragraph characterizes example 3 of the present disclosure, wherein example 3 also includes the subject matter according to any one of examples 1 or 2, above.

Providing the polysaccharide includes providing an alginate. The preceding subject matter of this paragraph characterizes example 4 of the present disclosure, wherein example 4 also includes the subject matter according to any one of examples 1, 2, or 3, above.

Providing the alginate includes providing sodium alginate. The preceding subject matter of this paragraph characterizes example 5 of the present disclosure, wherein example 5 also includes the subject matter according to any one of examples 1, 2, 3, or 4, above.

Reducing the viscosity of the polymer includes reducing the viscosity of the polymer to allow the polymer solution to be dispensed via a small gauge hypodermic needle. The preceding subject matter of this paragraph characterizes example 6 of the present disclosure, wherein example 6 also includes the subject matter according to example 1, above.

The small gauge hypodermic needle includes a hypodermic needle including a gauge less than or equal to 27 gauge. The preceding subject matter of this paragraph characterizes example 7 of the present disclosure, wherein example 7 also includes the subject matter according to any one of examples 1 and 6, above.

Injecting the polymer solution includes injecting the polymer solution into the vas deferens of the subject while the viscosity of the polymer is reduced using the small gauge hypodermic needle. The preceding subject matter of this paragraph characterizes example 8 of the present disclosure, wherein example 8 also includes the subject matter according to any one of examples 1, 6, and 7, above.

Reducing the viscosity of the polymer includes temporarily reducing the viscosity of the polymer. The preceding subject matter of this paragraph characterizes example 9 of the present disclosure, wherein example 9 also includes the subject matter according to example 1, above.

Temporarily reducing the viscosity of the polymer includes mixing the polymer and Glucono-delta-Lactone (GdL) to create the polymer solution. The preceding subject matter of this paragraph characterizes example 10 of the present disclosure, wherein example 10 also includes the subject matter according to any one of examples 1 and 9, above.

The polymer solution forms the polymer barrier to sperm in response to being present in the vas deferens for a predetermined amount of time and the predetermined amount of time is an amount of time for the subject to metabolize the GdL. The preceding subject matter of this paragraph characterizes example 11 of the present disclosure, wherein example 11 also includes the subject matter according to any one of examples 1, 9, and 10, above.

The polymer solution forms the polymer barrier to sperm for an amount of time for the subject to metabolize the polymer. The preceding subject matter of this includes the subject matter according to example 1, above.

The amount of time is at least one year. The preceding subject matter of this paragraph characterizes example 13 of the present disclosure, wherein example 13 also includes the subject matter according to example 1, above.

The method also includes injecting a calcium chelator in the vas deferens to degrade the polymer barrier. The preceding subject matter of this paragraph characterizes example 14 of the present disclosure, wherein example 14 also includes the subject matter according to example 1, above.

Injecting the calcium chelator in the vas deferens includes injecting ethylenediaminetetra-acetic acid (EDTA) in the vas deferens. The preceding subject matter of this paragraph characterizes example 15 of the present disclosure, wherein example 14 also includes the subject matter according to any one of examples 1 and 14, above.

Injecting the EDTA in the vas deferens comprises injecting the EDTA in the vas deferens via a hypodermic needle including a gauge less than or equal to 27 gauge. The preceding subject matter of this paragraph characterizes example 16 of the present disclosure, wherein example 16 also includes the subject matter according to any one of examples 1, 14, and 15, above.

Also disclosed herein is another method for male birth control. The method includes locating a polymer barrier to sperm in a vas deferens of a subject and injecting a calcium chelator in the vas deferens to degrade the polymer barrier. The preceding subject matter of this paragraph characterizes example 17 of the present disclosure.

The calcium chelator includes ethylenediaminetetra-acetic acid (EDTA). The preceding subject matter of this paragraph characterizes example 18 of the present disclosure, wherein example 18 also includes the subject matter according to example 17, above.

Additionally, disclosed herein is a further method for male birth control. The method includes reducing a viscosity of a polymer to create a polymer solution, injecting the polymer solution into a vas deferens of a subject while the viscosity of the polymer is reduced to create a polymer barrier to sperm in the vas deferens subsequent to the polymer increasing in viscosity while present in the vas deferens, locating the polymer barrier in the vas deferens, and injecting a calcium chelator in the vas deferens to degrade the polymer barrier. The preceding subject matter of this paragraph characterizes example 19 of the present disclosure.

The polymer includes sodium alginate and the calcium chelator includes ethylenediaminetetra-acetic acid (EDTA). The preceding subject matter of this paragraph characterizes example 20 of the present disclosure, wherein example 20 also includes the subject matter according to example 19, above.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
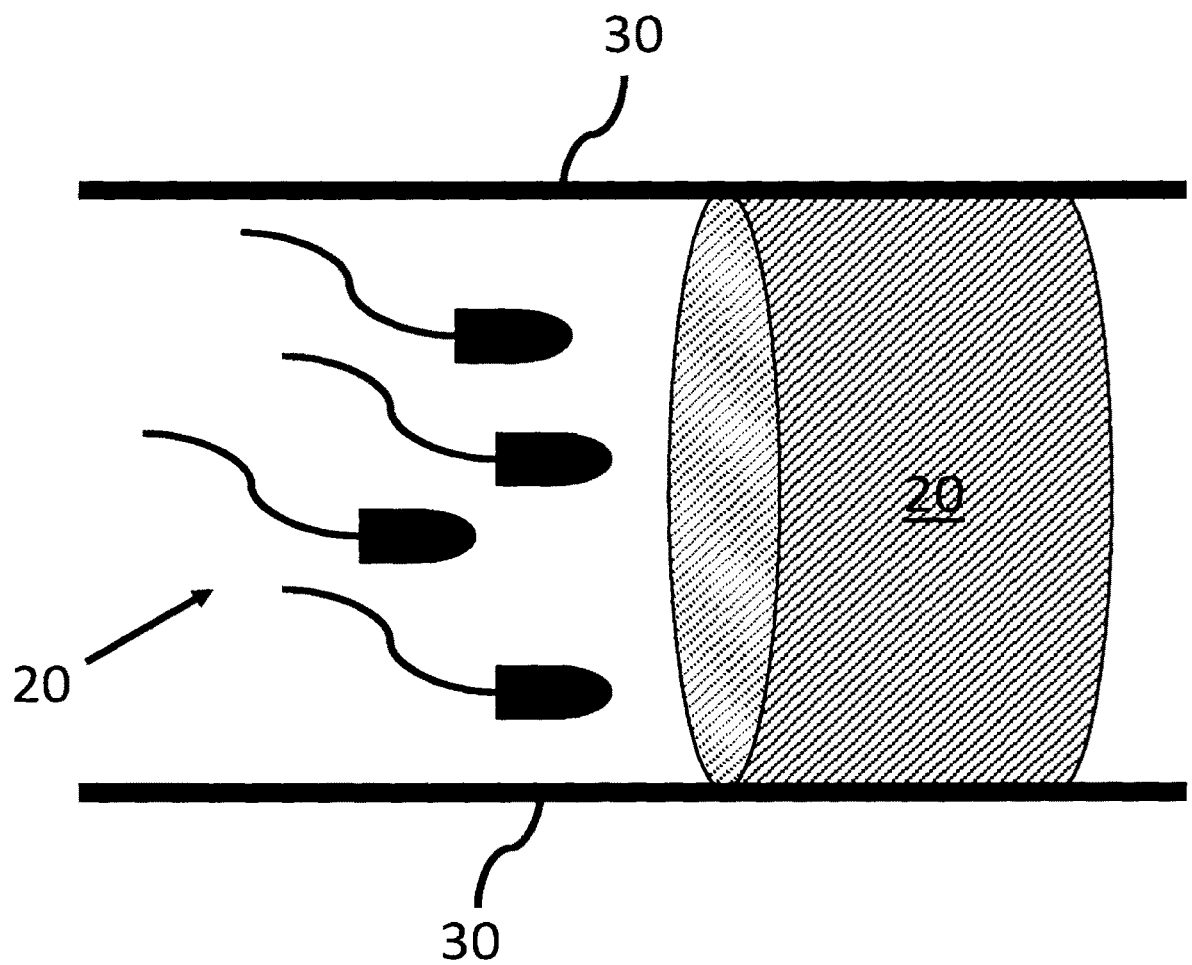
FIG. 1 is a schematic diagram of a prior art polymer barrier to sperm in the vas deferens of a male subject.

The various embodiments disclosed herein provide reversible methods for reversible birth control for male subjects (e.g., male humans, non-birthing humans, male animals, etc.). Also disclosed herein are reversible contraceptives for male subjects.

Various embodiments disclosed herein provide, among other things, a barrier (or implant) that provides a less traumatic long term male contraceptive. The barrier is injected or otherwise placed into the vas deferens of a male subject (e.g., a male human, a non-birthing human, a male animal, a non-birthing animal, etc.) to block the outflow of sperm. Other embodiments provide a barrier that includes a spermicide that can provide a two-barrier defense—a physical block and a chemical defense.

The barrier can include a polymer or polymer matrix that blocks the vas deferens and, in some embodiments, can further support a sperm inhibitor as a secondary defense. The polymer may be a biocompatibly polymer, such as a polysaccharide (e.g., an alginate (e.g., sodium alginate)). The barrier blocks or at least partially blocks the vas deferens and, in some embodiments, can further provide a sperm inhibitor to incapacitate (e.g., kill) sperm that passes by the barrier. In certain embodiments, the sperm inhibitor includes a calcium blocker sperm inhibitor encapsulated in microparticles suspended in a semiporous hydrogel polymer.

Objects of the various embodiments can include, but are not limited to, providing reversible male contraception, providing a male contraceptive that does not fully block the vas deferens, providing a male contraceptive that partially occludes the vas deferens with a spermicidal agent, providing a microparticle polymer plug for male contraception, providing male contraception through a minimally invasive outpatient procedure, providing cost effective reversible male contraception, providing a male contraceptive with an improved reversal rate, providing a male contraceptive that does not include hormones, a male contraceptive with an effective life span of at least one year, providing a male contraceptive employing a partial occlusion that avoids granulomas in the vas deferens, providing a male contraceptive with multiple lines of action (e.g., a semipermeable barrier and a spermicidal agent, providing a spermicide that is soluble in organic solvents or a thinning agent, providing a spermicidal implant that predictably degrades in the body over time, providing a barrier that is both a physical block and a chemical/drug delivery device, providing a polymer that can be injected into the vas deferens with a 27-gauge needle or smaller, providing a barrier without harming the vas deferens, and providing a barrier including a spermicide without harming the vas deferens. The above and other objects may be achieved using barriers that at least partially blocks/occludes the vas deferens and may further include a sperm inhibitor for incapacitating sperm that are not occluded/block by the barrier. The barrier may include a scaffold to secure the barrier in position in the vas deferens.

With reference to the drawings, FIG. 1 is a schematic diagram of a prior art polymer barrier 10 for blocking and/or occluding the outflow of sperm 20 in the vas deferens 30 of a male subject. The polymer barrier 10 is typically injected into the vas deferens 30 using a hypodermic needle.

Contemporary polymers that form the polymer barrier 10 typically include a relatively high viscosity. Typically, a 25-gauge or larger hypodermic needle is required to inject contemporary polymers into the vas deferens 30 to form the polymer barrier 10.

Large hypodermic needles (e.g., 25-gauge needles and larger) typically require a relatively large incision in the male subject's scrotum to access the vas deferens 30. Further, 25-gauge and larger hypodermic needles can leave a relatively large puncture hole in the vas deferens 30, which may leave the subject more vulnerable to infection, leave the subject more vulnerable to granulomas caused by sperm 20 leaking from the vas deferens 30, require stitches to close, and/or require a longer time to heal compared to smaller gauge hypodermic needles.

Figure 2:
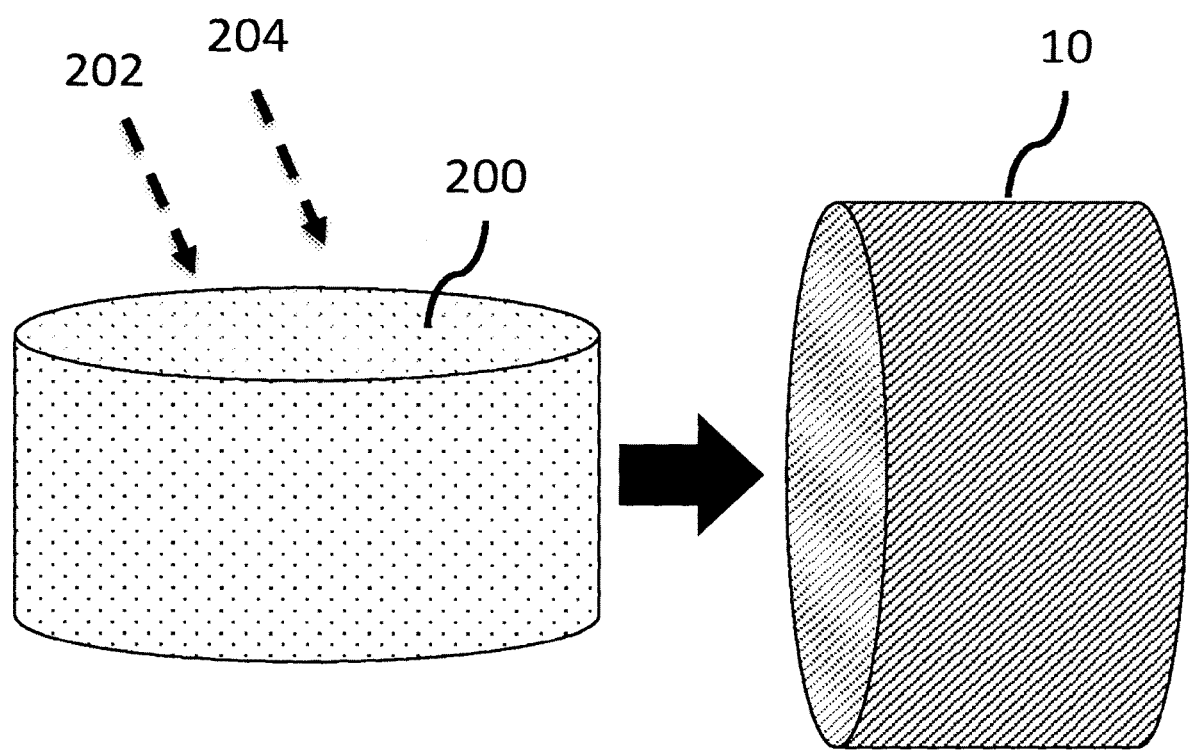
FIG. 2 is a schematic diagram of one embodiment of a polymer solution that can be inserted via a small gauge needle in the vas deferens of a male subject to form the polymer barrier shown in FIG. 1.

FIG. 2 is a schematic diagram of one embodiment of a polymer solution 200 that can form a polymer barrier 10 (see, FIG. 1) to block sperm 20 in the vas deferens 30 of a male subject. In various embodiments, a first portion of the polymer solution 200 includes a polymer 202 (e.g., a liquid and/or liquefiable polymer) and a second portion of the polymer solution 200 includes a thinning agent 204.

The polymer 202 may include any suitable polymer(s) that is/are known or developed in the future capable of being inserted into the vas deferens 30 of a male subject and forming a polymer barrier 10 to block the outflow of sperm 20. The polymer 202 may include a liquid and/or solid chemical state. The polymer 202, in various embodiments, includes a hydrogel, a starch, algae (e.g., brown algae), collagen, gelatin, fibrin, and/or the like, among other suitable polymers and/or substances that are possible, each of which is contemplated herein. In certain embodiments, the polymer 202 includes a natural polymer material and/or substance.

In various embodiments, the polymer 202 is biocompatible. In some embodiments, the polymer 202 that is biocompatible includes a polysaccharide, which can include any suitable polysaccharide. A polysaccharide can include a carbohydrate formed by many saccharide units (e.g., ten or more monosaccharides) in which the carbohydrate includes carbon (C), hydrogen (H), and oxygen (O) in a 1:2:1 ratio.

In certain embodiments, the polysaccharide includes an alginate, which can include any suitable alginate. An alginate includes (1,4) linked β-d-mannuronic and α-L-guluronic acids in pyranosic conformation, arranged in homogeneous (e.g., MM or GG) and heterogeneous (e.g., MG or GM) blocks. In one embodiment, the alginate includes sodium alginate ($NaC_6H_7O_6$), among other suitable alginates that are possible and contemplated herein.

In various embodiments, the polymer 202 includes any polymer substance(s) and/or type(s) of polymer including a viscosity that is capable of being temporarily decreased. In additional or alternative embodiments, the polymer 202 includes any polymer substance(s) and/or type(s) of polymer including a viscosity that is capable of being temporarily decreased and subsequently increased. As such, each of these polymers 202 can be considered a gelating polymer 202.

The thinning agent 204 may include any suitable substance(s) that is/are capable of temporarily reducing the viscosity of the polymer 202 included in the polymer solution 200. In various embodiments, the thinning agent 204 is capable of temporarily reducing the viscosity of the polymer 202 so that the polymer solution 200 can be injected into the vas deferens 30 using a 27-gauge or smaller hypodermic needle. Further, the thinning agent 204 may include any suitable substance(s) that is/are capable of being metabolized by the male subject so that the viscosity of the polymer 202 increases to form the polymer barrier 10 in the vas deferens. In certain embodiments, the thinning agent 204 includes glucono-delta-lactone (GdL), also known as, gluconolactone ($C_6H_{10}O_6$), among other thinning agents that are possible, each of which is contemplated herein. In additional or alternative embodiments, the thinning agent 204 includes calcium chloride, phosphate, lactate, acetate, aluminum, a calcium compound, a barium compound, and/or the like substances.

The thinning agent 204 used in to create a polymer solution 200 may depend on the polymer 202 used to form the polymer barrier 10. Similarly, the type of thinning agent 204 used in the polymer solution 200 may depend on the type polymer 202 used to form the polymer barrier 10. Further, the thinning agent 204 and/or type of thinning agent 204 used in the polymer solution 200 may depend on the polymer 202 and/or type of polymer 202 used to form the polymer barrier 10.

The ratio of polymer 202 to thinning agent 204 in the polymer solution 200 may include any suitable ratio that allows the thinning agent 204 to temporarily decrease the viscosity of the polymer 202 so that the polymer solution 200 can be injected into the vas deferens 30 using a 27-gauge or smaller needle. Additionally, or alternatively, the ratio of polymer 202 to thinning agent 204 in the polymer solution 200 may include any suitable ratio that allows the thinning agent 204 to be metabolized in the vas deferens 30 so that the temporarily decreased viscosity of the polymer 202 can be increased in the vas deferens 30 to form the polymer barrier 10 in the vas deferens 30 in response to the male subject metabolizing the thinning agent 204.

The ratio of polymer 202 to thinning agent 204 used in the polymer solution 200 may depend on the polymer 202 used to form the polymer barrier 10. Similarly, the ratio of polymer 202 to thinning agent 204 used in the polymer solution 200 may depend on the type polymer 202 used to form the polymer barrier 10. Further, the ratio of polymer 202 to thinning agent 204 used in the polymer solution 200 may depend on the polymer 202 and/or type of polymer 202 used to form the polymer barrier 10.

Example ratios of polymer 202 to thinning agent 204 in the polymer solution 200 can include, but are not limited to 10:1, 7:1 5:1, 4:1, 3:1, 2:1, and 1:1, among other ratios that are possible, each of which is contemplated herein. In one non-limiting example of a polymer solution 200 including sodium alginate and GdL, the ratio of sodium alginate to GdL is 1:1 or equal parts of sodium alginate and GdL.

The amount of the polymer solution 200 that is injected into the vas deferens 30 can be any suitable amount of the polymer solution 200 that can form a polymer barrier 10 in the vas deferens 30 sufficient to block the outflow of sperm 20. In various embodiments, the amount of the polymer solution 200 that is injected into the vas deferens 30 is in the range of about one gram (1 g) to about three grams (3 g) by weight and/or about one milliliter (1 mL) or one cubic centimeter (1 cc) to about three milliliters (3 mL) or three cubic centimeters (3 cc) by volume, among other ranges and/or amounts of the polymer solution 200 that are possible, each of which is contemplated herein. In certain embodiments, the amount of the polymer solution 200 that is injected into the vas deferens 30 is about two grams (2 g) by weight and/or about two milliliters (2 mL) or 2 cubic centimeters (2 cc) by volume, among other amounts of the polymer solution 200 by weight and/or volume that are possible, each of which is contemplated herein.

In practice, a polymer solution 200 including a polymer 202 and a thinning agent 204 is provided to a small gauge needle (e.g., a 27-gauge needle or smaller). The thinning agent 204 acts upon the polymer 202 to decrease the viscosity of the polymer 202 and/or the polymer solution 200.

To insert the polymer solution 200, a male subject is prepared by administering a local anesthetic. A small incision is made in the male subject's scrotum and the male subject's vas deferens 30 is identified and isolated. The needle is attached to an angiocatheter and inserted at an angle (e.g., an upward angle) in which a saline flush method can be used to confirm that the needle is inserted at the correct depth in the vas deferens 30. Leaving the needle in place, the saline syringe is detached and replaced with a contraceptive syringe including a pre-filled amount of the polymer solution 200 and the polymer solution 200 is dispensed into the vas deferens 30.

The needle is removed (e.g., pulled out) and the vas deferens 30 is allowed to recede back into the scrotum. The procedure is repeated on the male subject's second vas deferens 30. No stitches are needed due to the small puncture hole and the small incision can heal on its own. Once in the vas deferens 30, the thinning agent 204 (e.g., GdL, etc.) is metabolized by the male subject, which increases the viscosity of the polymer 202 and/or returns the polymer 202 to its original and/or natural viscosity forming the polymer barrier 10 in the vas deferens 30.

Over time, the male subject metabolizes the polymer barrier 10, which can enable and/or allow sperm 20 to flow through and/or out of the previously blocked/occulated vas deferens 30. The amount of time to metabolize the polymer barrier 10 can vary depending upon the individual. In various embodiments, the polymer barrier 10 can remain effective in blocking sperm 20 for at least one year and up to about two years.

Figure 3:
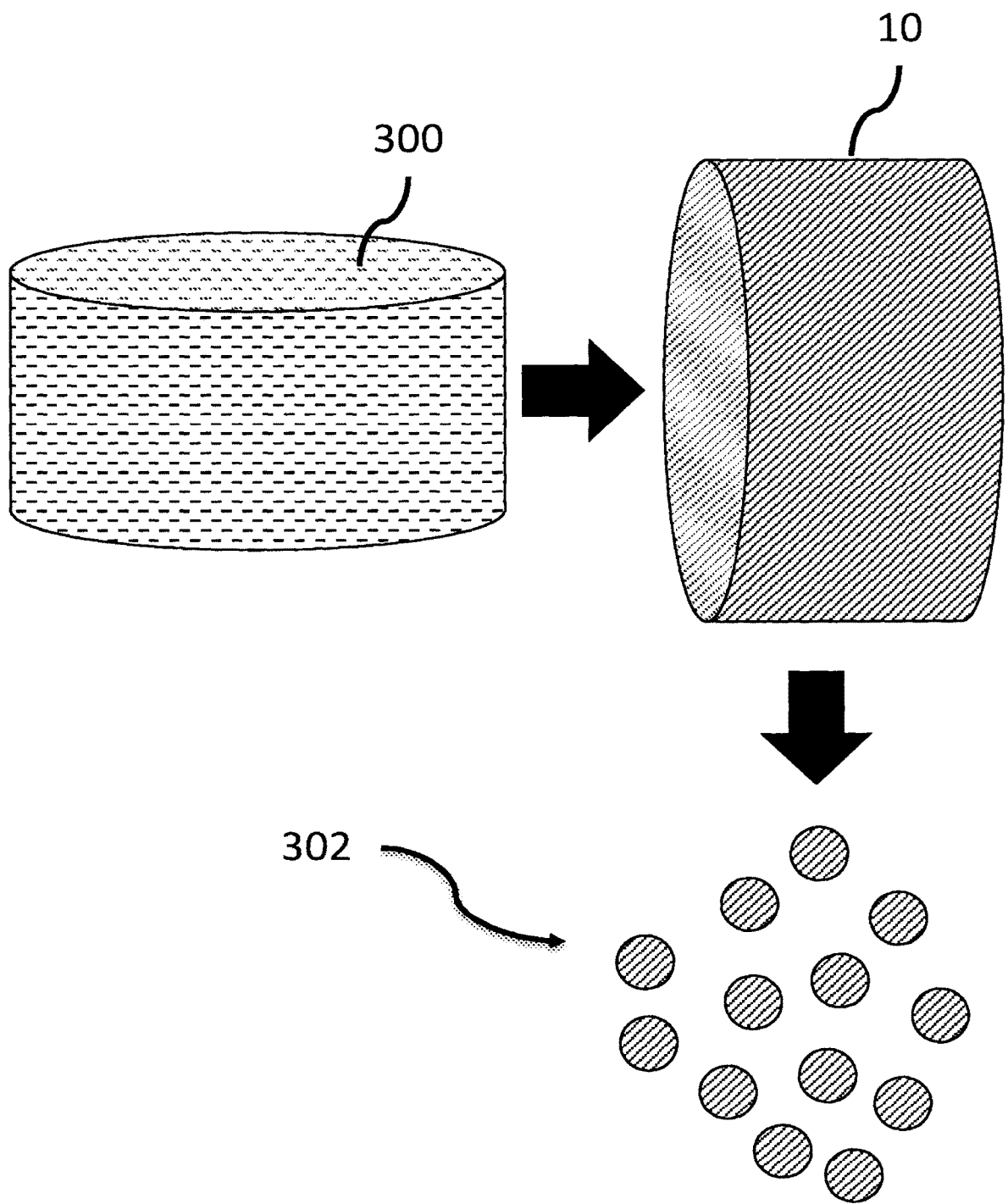
FIG. 3 is a schematic diagram one embodiment of a calcium chelator that can degrade the polymer barrier shown in FIG. 1.

FIG. 3 is a schematic diagram of one embodiment of a calcium chelator 300 (or chelating agent) for degrading a polymer 202 and/or polymer barrier 10. The calcium chelator 300 may include any suitable solution(s) and/or substance(s) that is/are capable of degrading, dissolving, and/or breaking down the polymer 202 and/or polymer barrier 10.

Some non-limiting examples of a calcium chelator include, but are not limited to, a saline solution (e.g., phosphate buffered saline (PBS)), and/or water ($H_2O$), etc., among other chelating agents and/or substances that are possible, each of which is contemplated herein. In some embodiments, the calcium chelator includes a solution including a potential hydrogen (pH) in the range of about 5 pH to about 10 pH, among other pH levels that are possible, each of which is contemplated herein. In certain embodiments, the calcium chelator 300 includes ethylenediaminetetra-acetic acid (EDTA), among other solution(s) and/or substance(s) that is/are possible, each of which is contemplated herein.

At a desired time, the calcium chelator 300 may be injected/added to the site of the polymer barrier 10 to degrade the polymer 202 and/or polymer barrier 10. The calcium chelator 300 acts on the polymer 202 and/or polymer barrier 10 to degrade/break down the polymer barrier into particles 302 of polymer 202, which can allow the particles 302 to be flushed from the vas deferens 30.

The calcium chelator 300 may be injected into the vas deferens 30 and/or polymer barrier 10 using any sized needle. In various embodiments, the calcium chelator 300 can be injected using a 27-gauge or smaller needle.

The amount of the calcium chelator 300 that is injected into the vas deferens 30 and/or polymer barrier 10 can be any suitable amount that can degrade the polymer 202 and/or polymer barrier 10 in the vas deferens 30 sufficient to unblock the outflow of sperm 20. In various embodiments, the amount of the calcium chelator 300 that is injected into the vas deferens 30 and/or polymer barrier 10 is in the range of about two grams (2 g) to about five grams (5 g) by weight and/or about 2 mL or 2 cc to about five milliliters (5 mL) or five cubic centimeters (5 cc) by volume, among other ranges and/or amounts of the calcium chelator 300 that are possible, each of which is contemplated herein. In certain embodiments, the amount of the calcium chelator 300 that is injected into the vas deferens 30 and/or polymer barrier 10 is about 2 g by weight and/or 2 mL/2 cc by volume, among other amounts by weight and/or volume that are possible, each of which is contemplated herein.

To insert the calcium chelator 300, a male subject is prepared by administering a local anesthetic. A small incision is made in the male subject's scrotum and the male subject's vas deferens 30 is identified and isolated. The location and/or site of the polymer barrier 10 is identified and isolated.

The needle is attached to an angiocatheter and inserted at an angle (e.g., an upward angle) in which a saline flush method can be used to confirm that the needle is inserted at the correct depth in the vas deferens 30. Leaving the needle in place, the saline syringe is detached and replaced with a syringe including a pre-filled amount of the calcium chelator 300 and the calcium chelator 300 is dispensed into the vas deferens 30 and/or polymer barrier 10 and the vas deferens 30 is flushed with a saline solution (e.g., 2 mL/cc of saline solution).

The needle is removed (e.g., pulled out) and the vas deferens 30 is allowed to recede back into the scrotum. The procedure is repeated on the other polymer barrier 10 in the male subject's second vas deferens 30. No stitches are needed due to the small puncture hole and the small incision can heal on its own.

After the polymer 202 and/or polymer barrier 10 is sufficiently degraded and/or caused to be degraded, sperm 20 are no longer blocked and are able to flow through the vas deferens 30. Here, because the polymer barrier 10 can be degraded at will, this form of male birth control is considered temporary and/or reversible.

Figure 4:
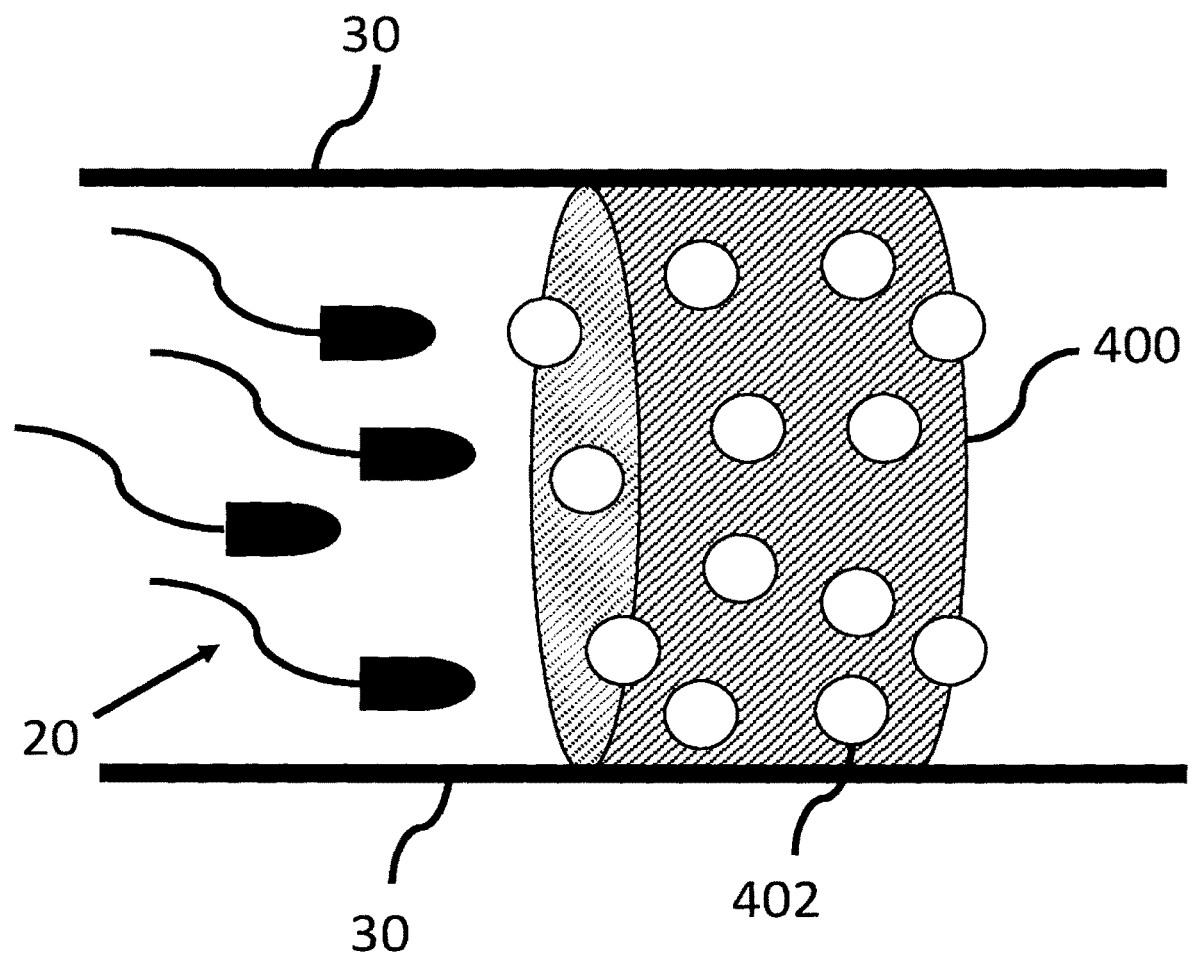
FIG. 4 is a schematic diagram of one embodiment of a polymer barrier to sperm including a spermicide.

FIG. 4 is a schematic diagram of one embodiment of a polymer barrier 400 including spermicide (see, spermicide 504 in FIG. 5) that can be injected or otherwise placed in the vas deferens 30 of a male subject. The polymer barrier 400 can physically block or at least partially block the outflow of sperm 20 in the vas deferens 30 and the spermicide can chemically incapacitate the sperm 20. In this manner, the polymer barrier 400 can create a two-barrier defense to sperm 20 in the vas deferens 30.

Figure 5:
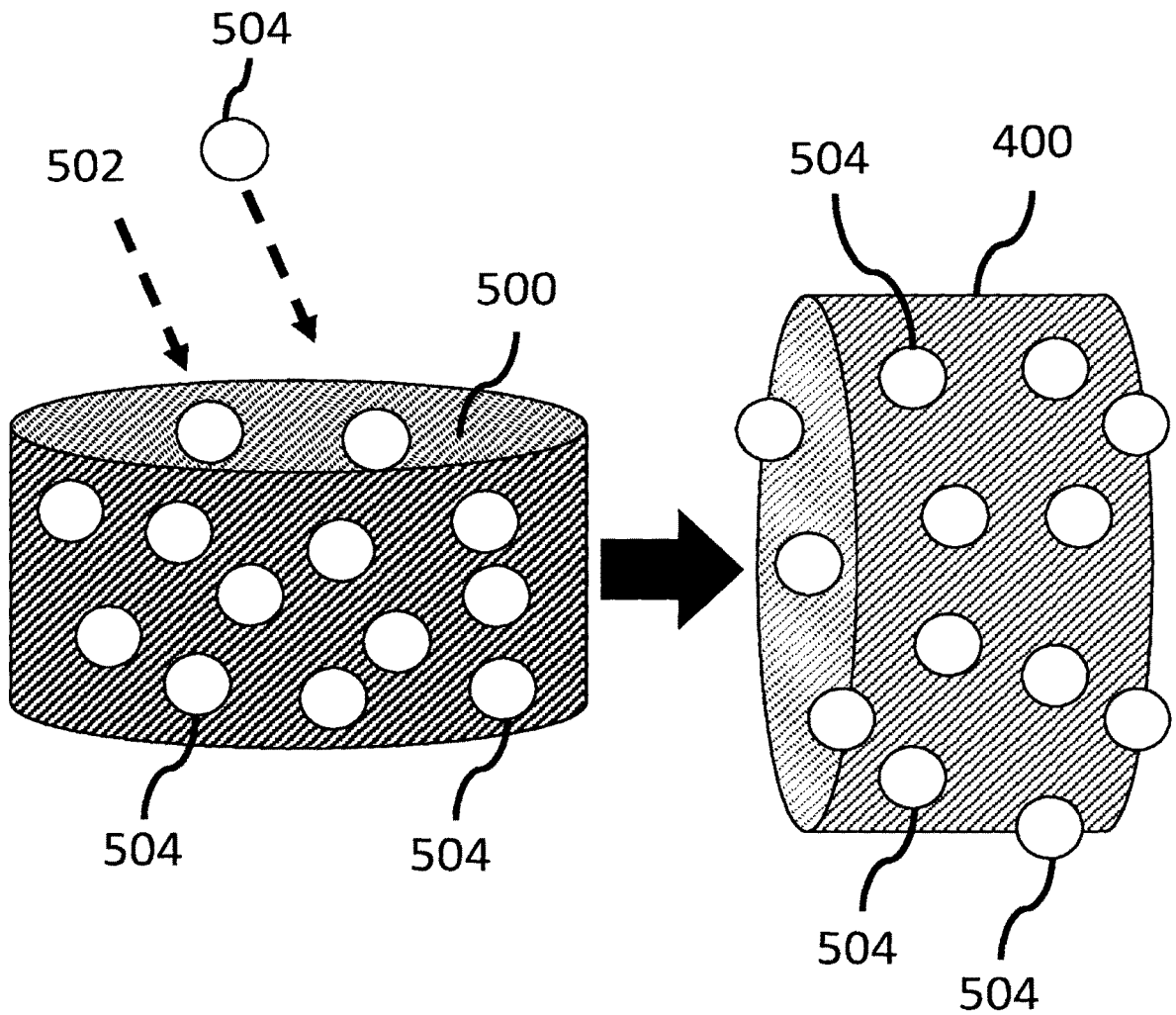
FIG. 5 is a schematic diagram of one embodiment of a polymer solution including a polymer and a spermicide that can be inserted in the vas deferens of a male subject to form the polymer barrier of FIG. 4.

FIG. 5 is a schematic diagram of one embodiment of a polymer solution 500 that can form a polymer barrier 400 (see, FIG. 4) including a spermicide to physically block or at least partially block sperm 20 in the vas deferens 30 of a male subject and/or incapacitate sperm 20 in the vas deferens 30. In various embodiments, a first portion of the polymer solution 500 includes a polymer 502 and a second portion of the polymer solution 500 includes a spermicide 504.

The polymer 502 may include any suitable polymer(s) that is/are known or developed in the future capable of being inserted into the vas deferens 30 of a male subject and forming a polymer barrier 400 to physically block the outflow of sperm 20. The polymer 502 may include a liquid and/or solid chemical state. The polymer 502, in some embodiments, includes a hydrogel, among other suitable polymers and/or substances that are possible, each of which is contemplated herein.

In various embodiments, the polymer 502 is biocompatible. In some embodiments, the polymer 502 that is biocompatible includes a polysaccharide, which can include any suitable polysaccharide.

In certain embodiments, the polysaccharide includes an alginate, which can include any suitable alginate. In one embodiment, the alginate includes sodium alginate, among other suitable alginates that are possible and contemplated herein.

The polymer solution 500 may include any suitable amount of the polymer 502 that can form a polymer barrier 400 in the vas deferens 30 sufficient to physically block or at least partially block the outflow of sperm 20. In various embodiments, the amount of the polymer 502 in the polymer solution 500 is in the range of about 1 g to about 3 g by weight and/or about 1 mL/cc to about 3 mL/cc by volume, among other ranges and/or amounts of the polymer 502 that are possible, each of which is contemplated herein. In certain embodiments, the amount of the polymer 502 in the polymer solution 500 is about 2 g by weight and/or about 2 mL/cc by volume, among other amounts of the polymer 502 by weight and/or volume that are possible, each of which is contemplated herein.

The spermicide 504 may include any suitable substance(s) that is/are capable of incapacitate (e.g., kill) sperm 20. In certain embodiments, the spermicide 504 can include a sperm inhibitor or other mechanism capable of incapacitating sperm 20.

In various embodiments, the spermicide 504 can include any suitable chemical, drug, hormone, element, and/or other composition that is capable of incapacitating sperm 30. In various embodiments, the spermicide 504 includes a calcium channel blocker, an essential oil (e.g., neem oil, etc.), and/or citric acid, among other substance(s) that is/are possible, each of which is contemplated herein. In one embodiment, the calcium channel blocker includes nifedipine, among other possible channel blockers, each of which is contemplated herein. In additional or alternative embodiments, the spermicide 504 includes an acid (e.g., a pH less than 7 pH).

Figure 10A:
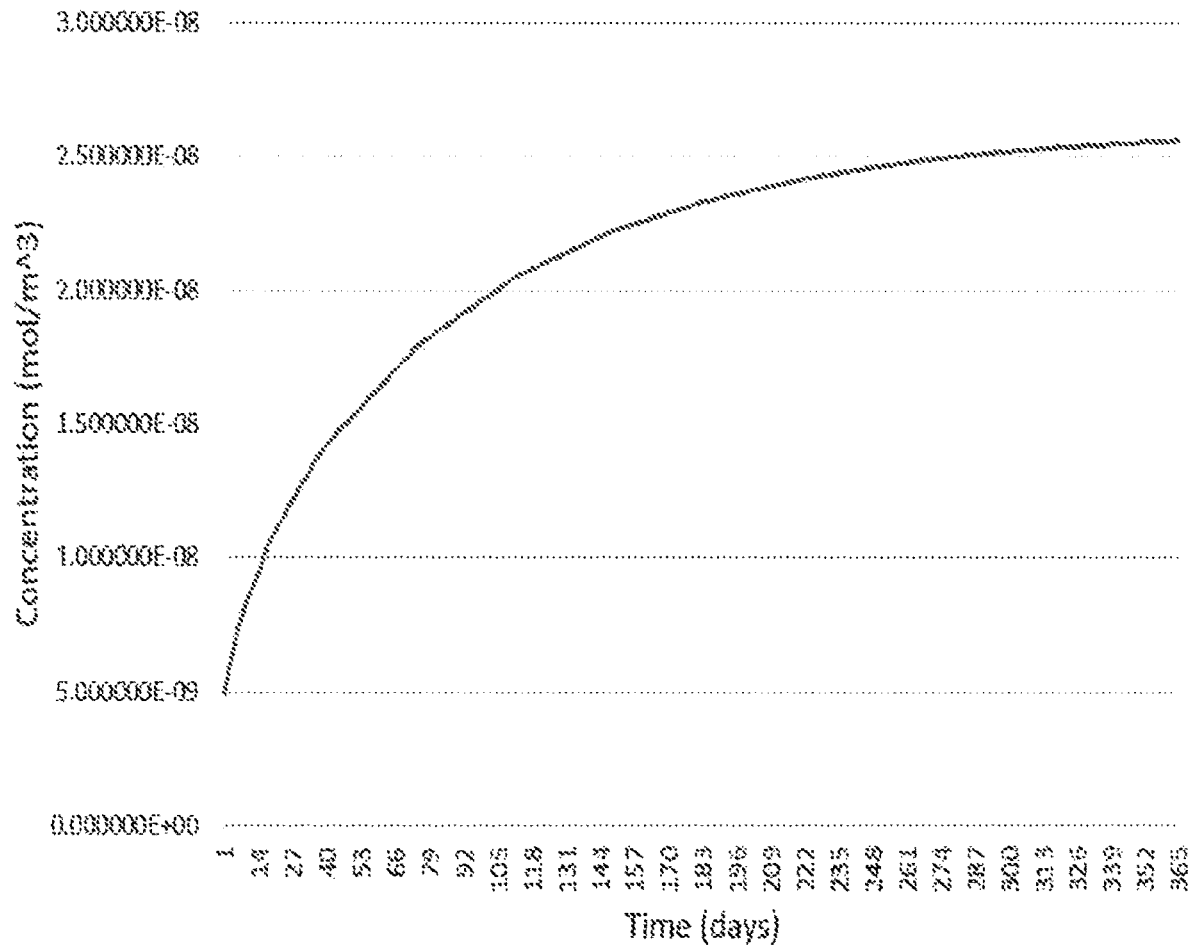
FIGS. 10A and 10B are graphs illustrating the concentration of one embodiment of a spermicide included in the polymer barrier of FIG. 4 over about one year.
Figure 10B:
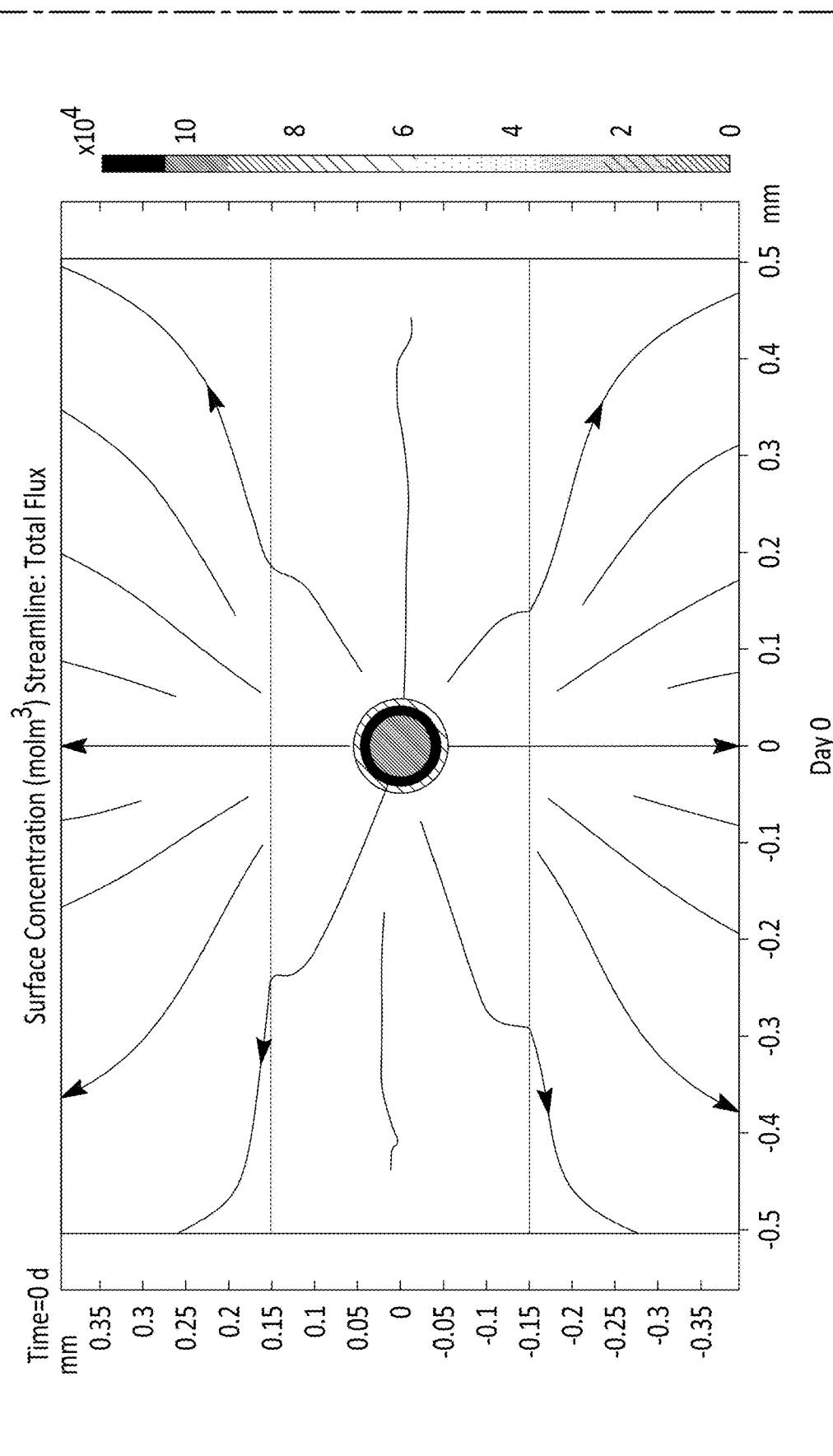
Figure 10B:
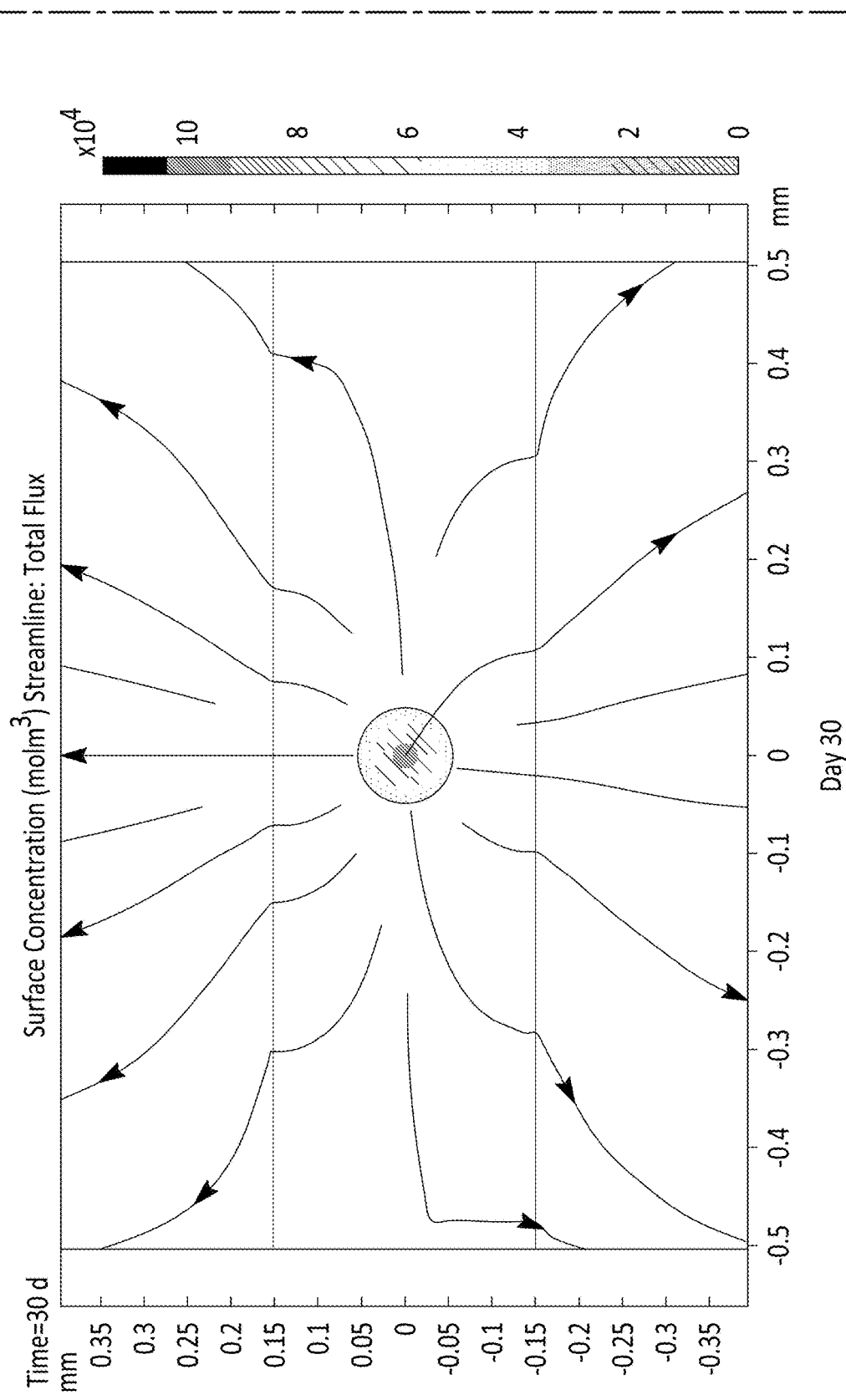
Figure 10B:
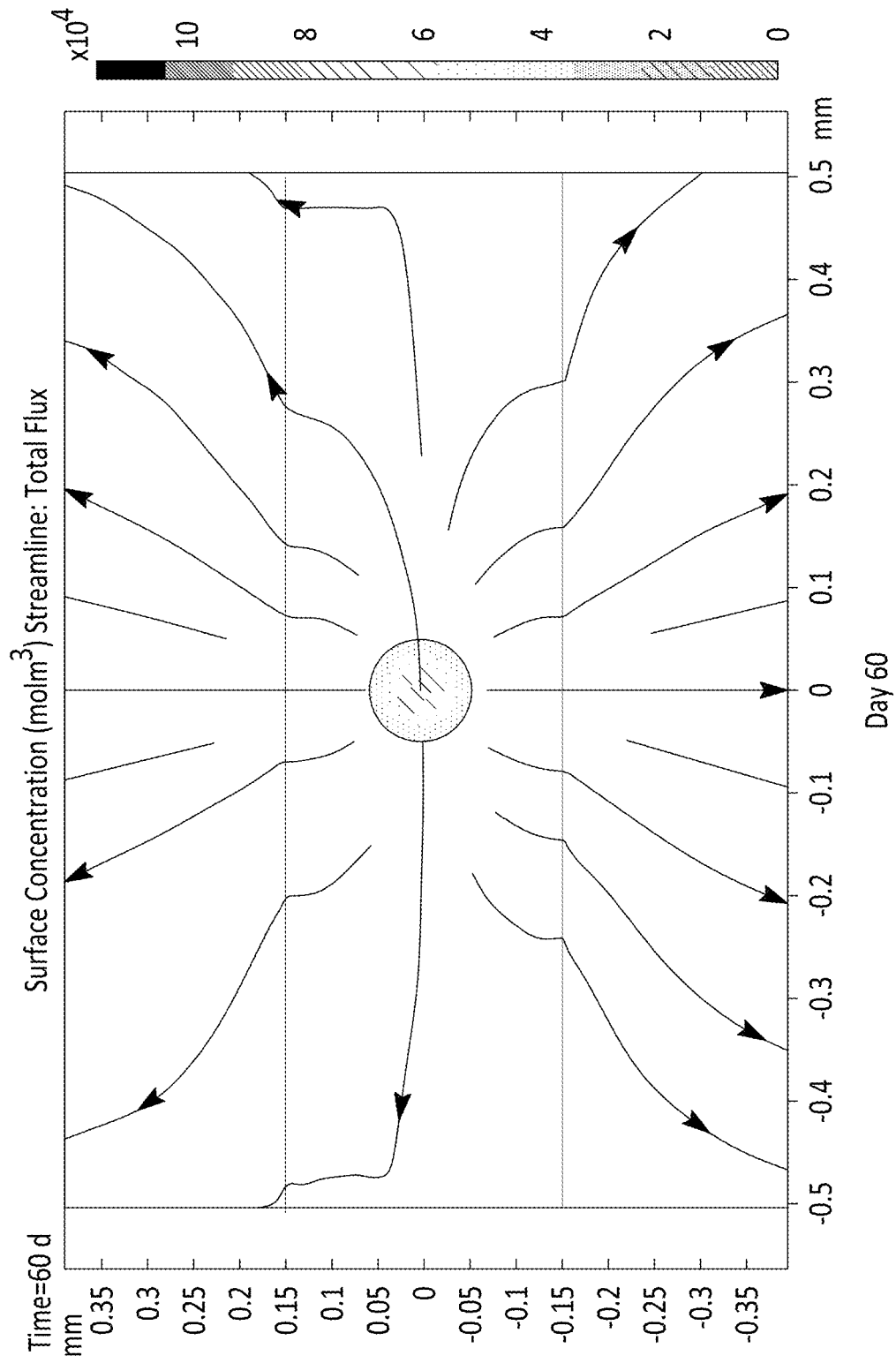
Figure 10B:
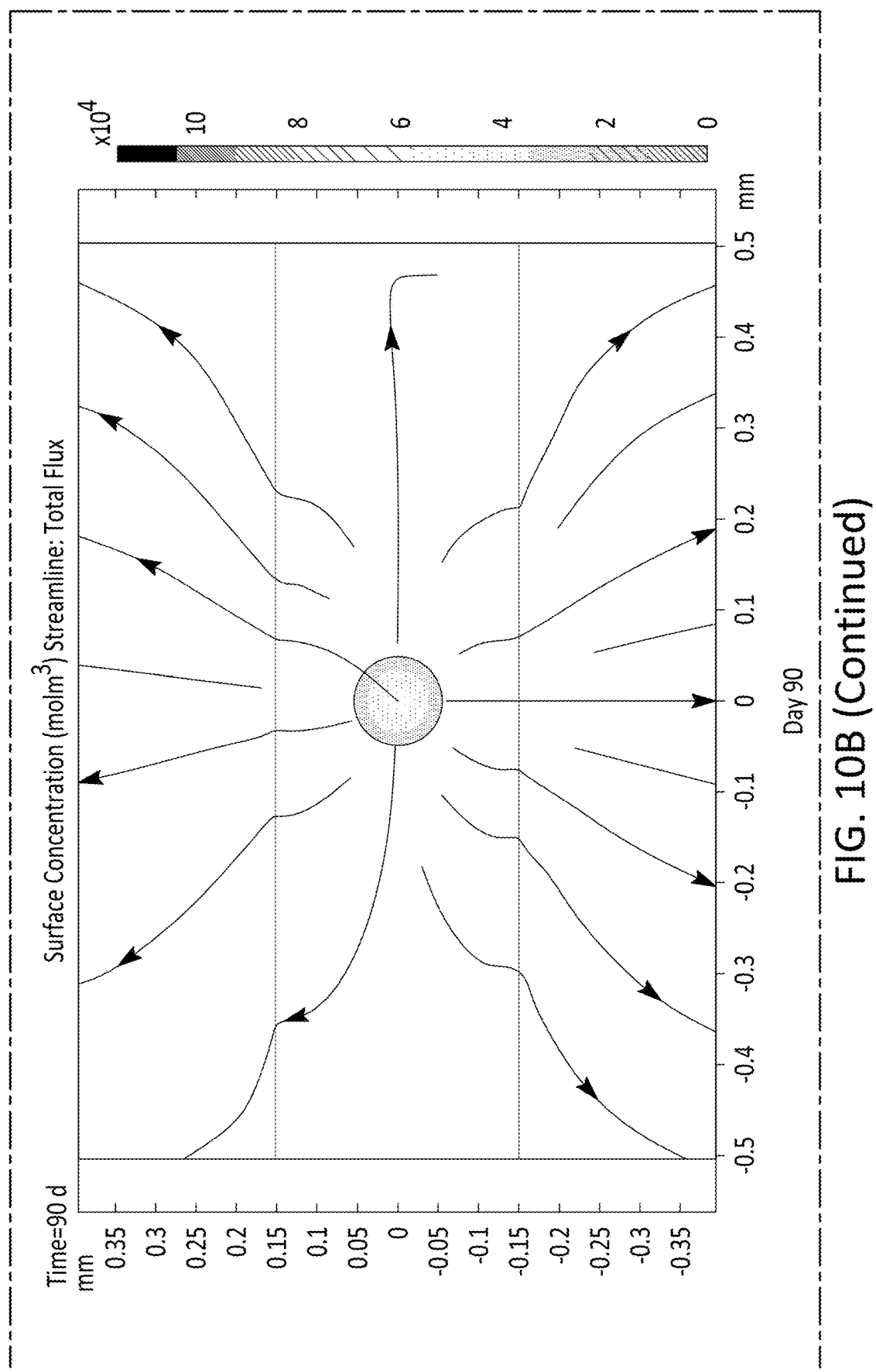
Figure 10B:
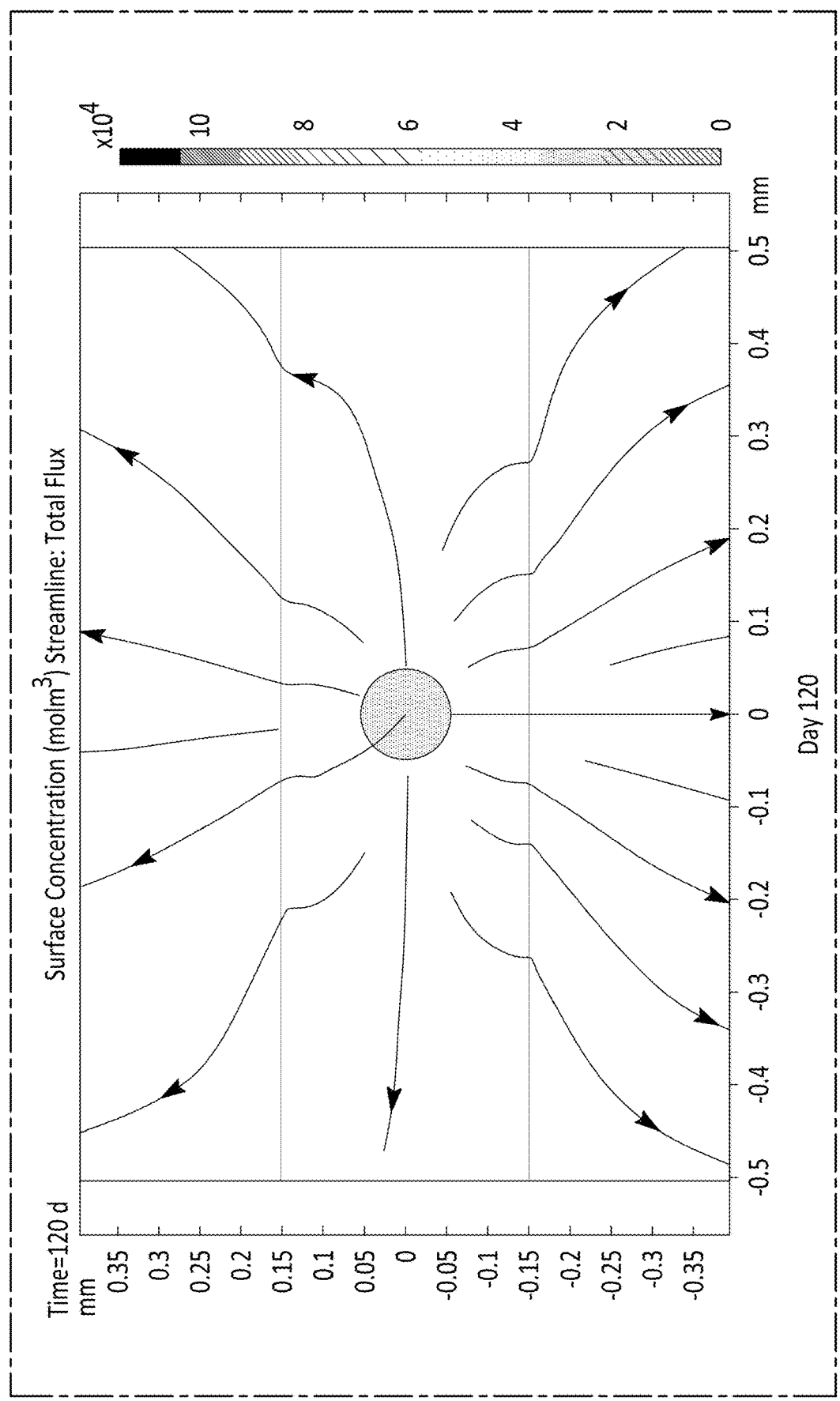
Figure 10B:
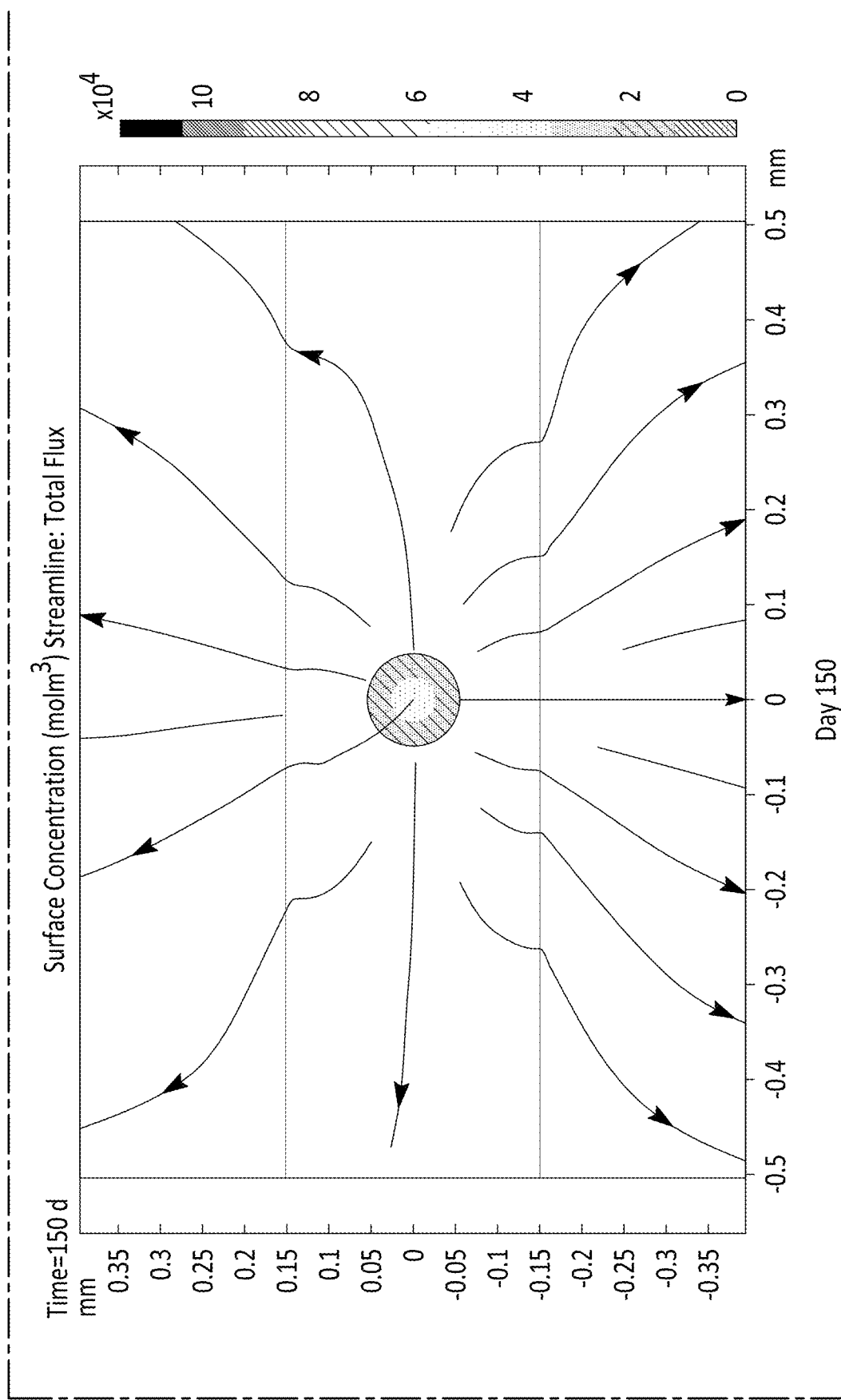
Figure 10B:
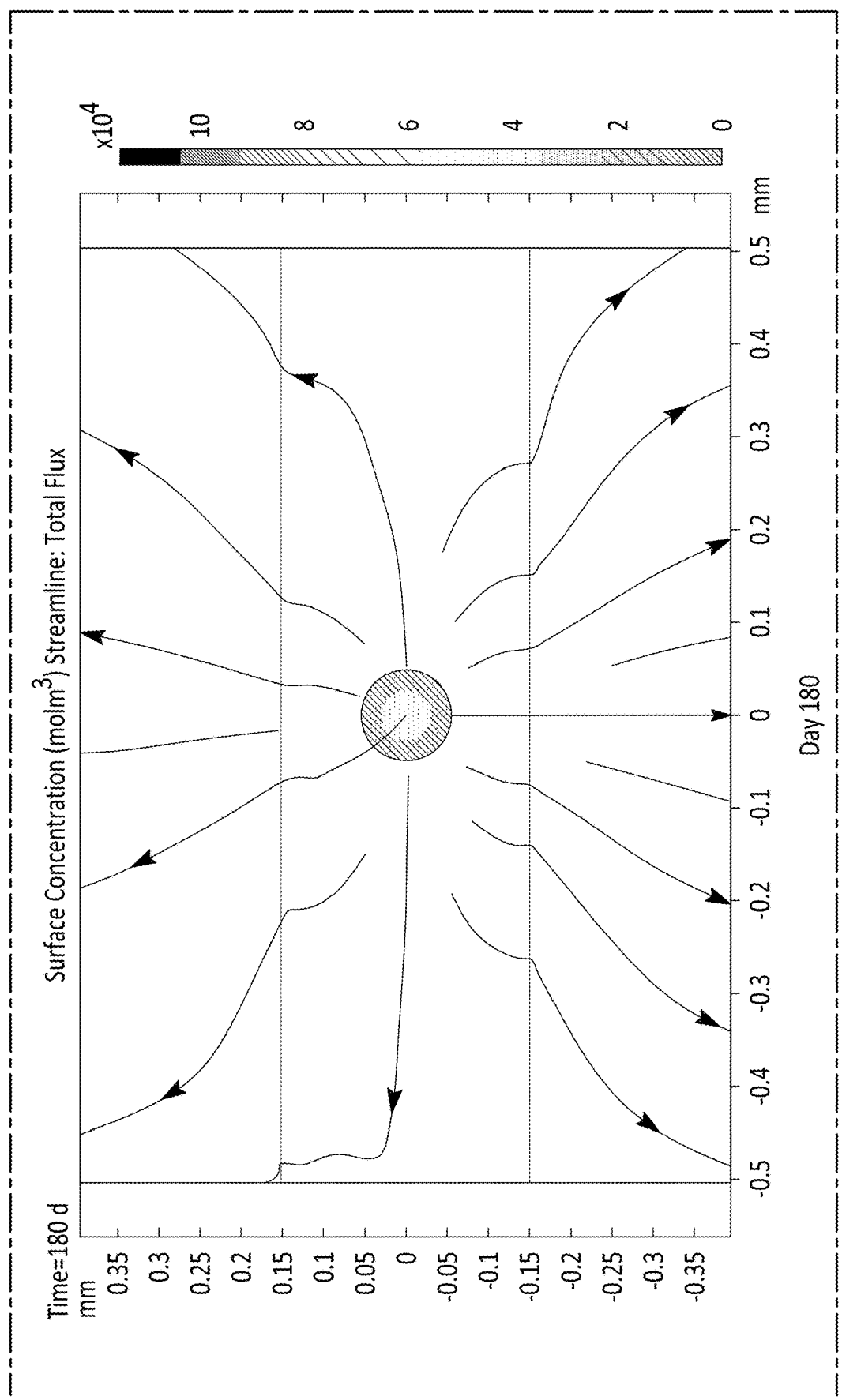
Figure 10B:
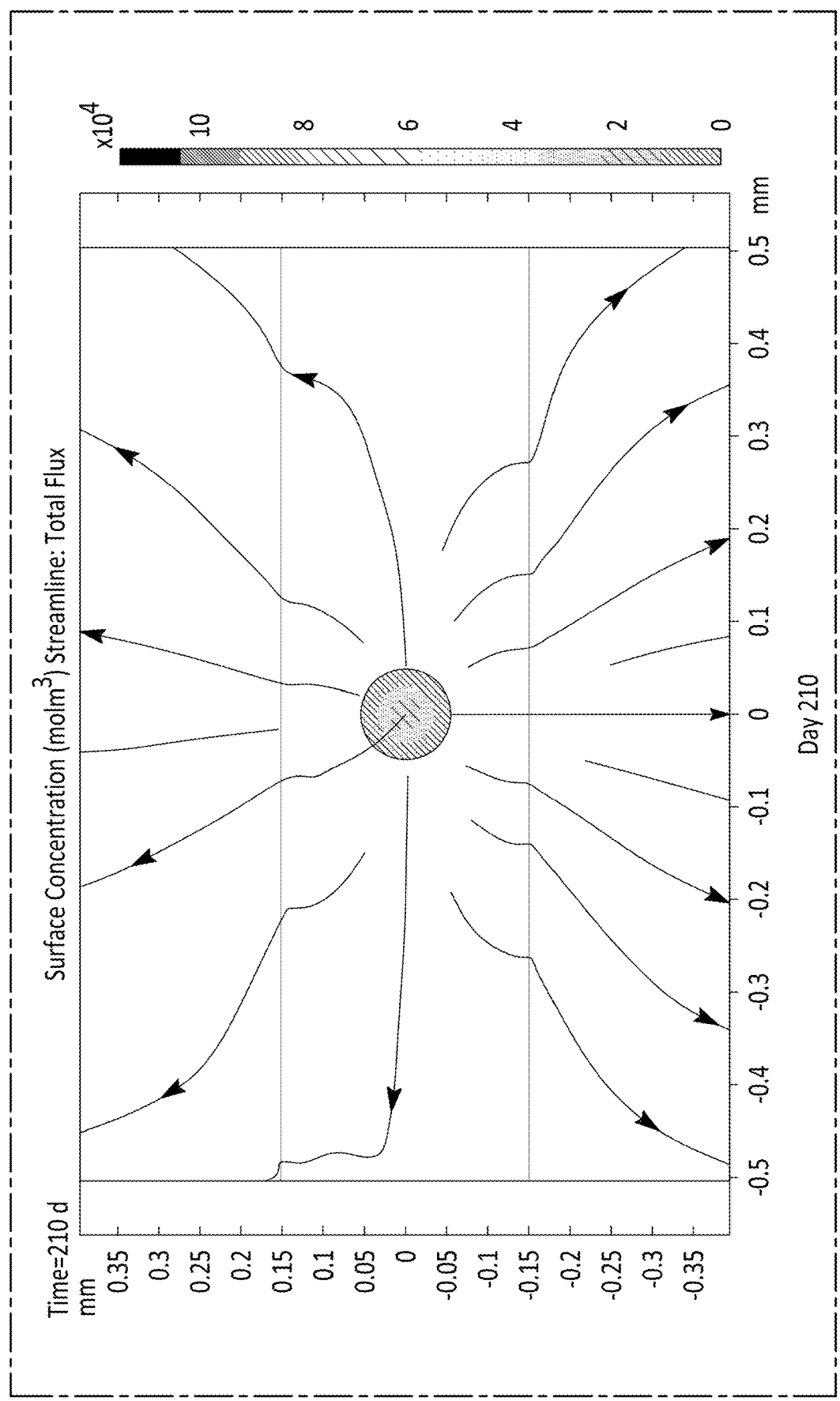
Figure 10B:
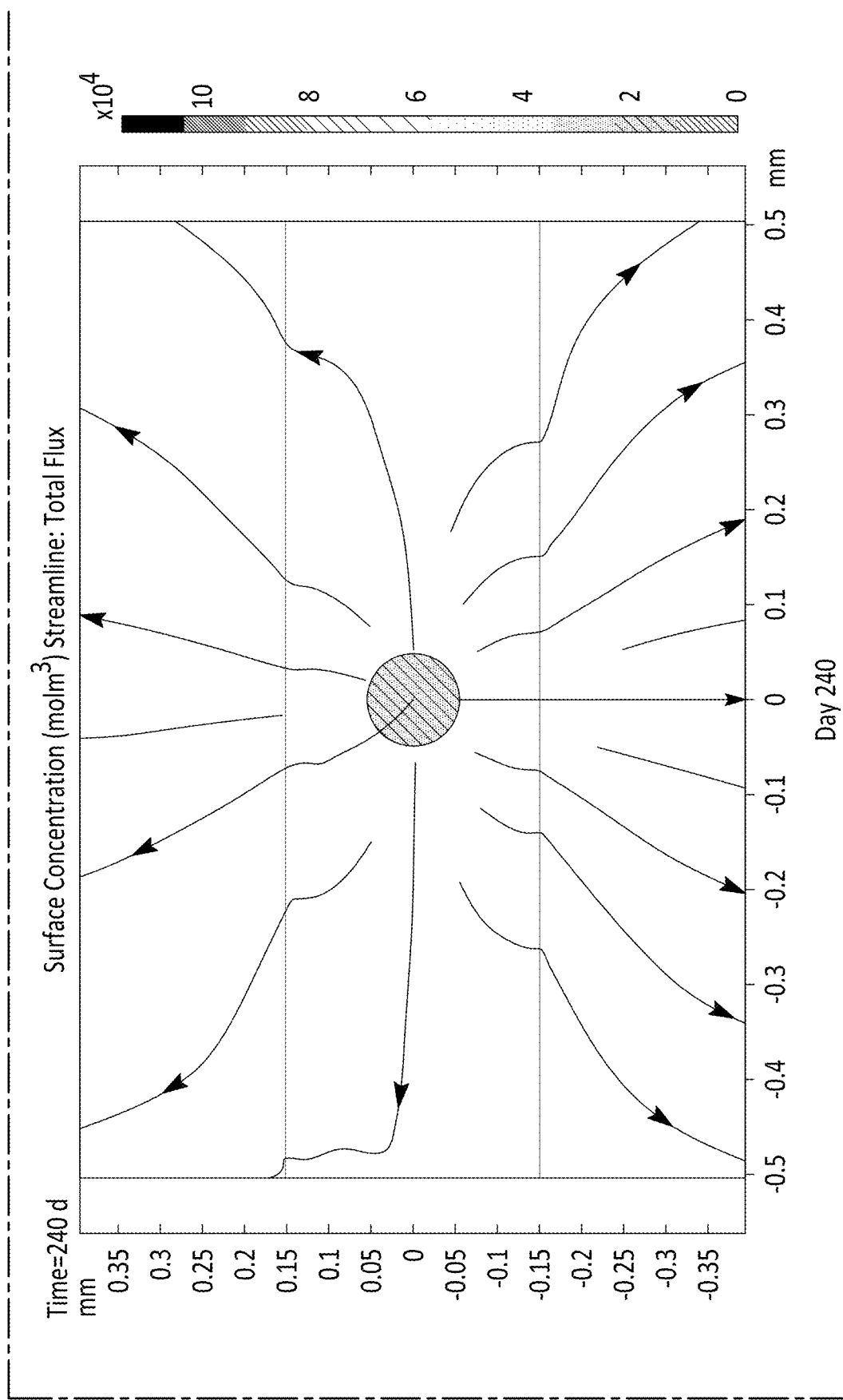
Figure 10B:
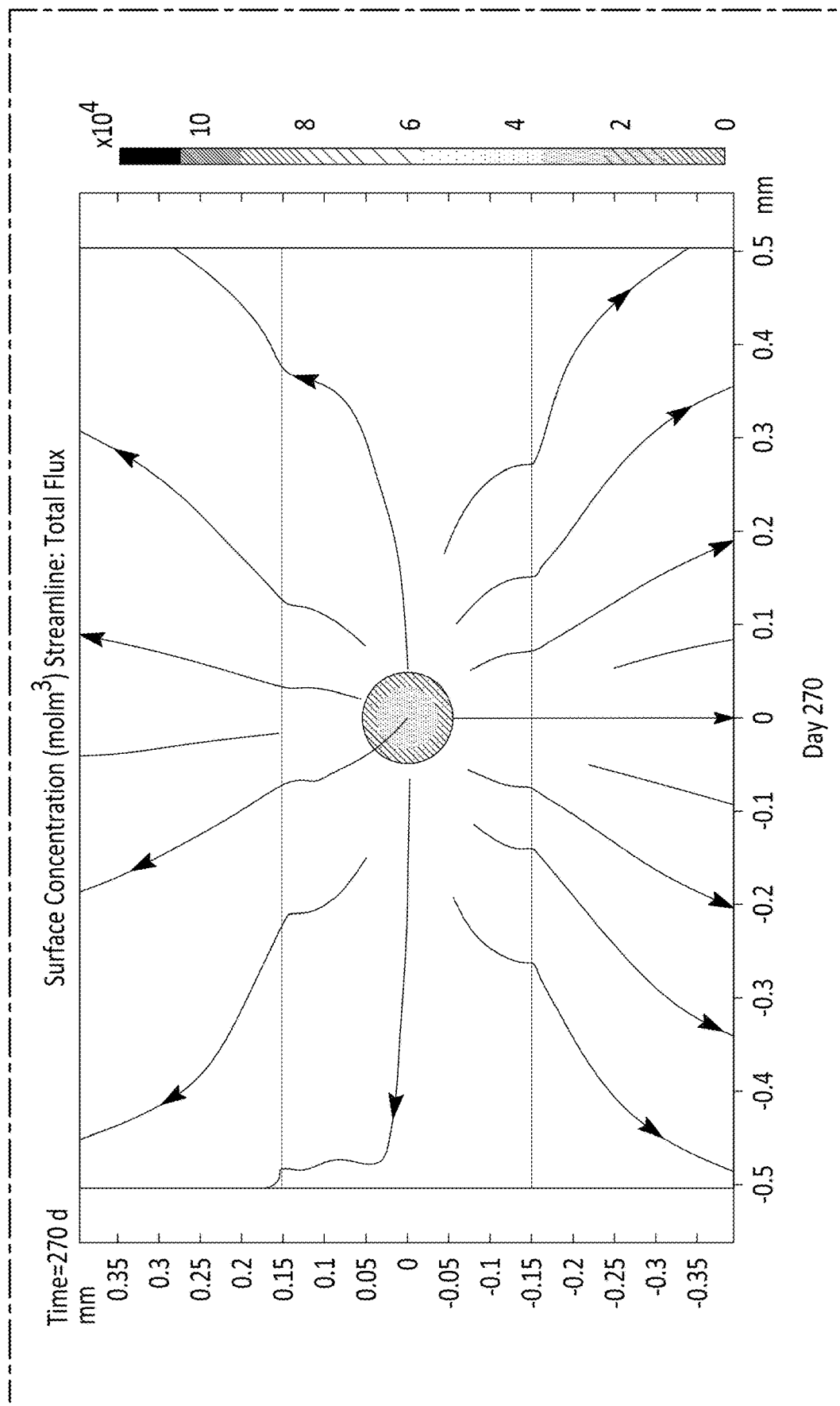
Figure 10B:
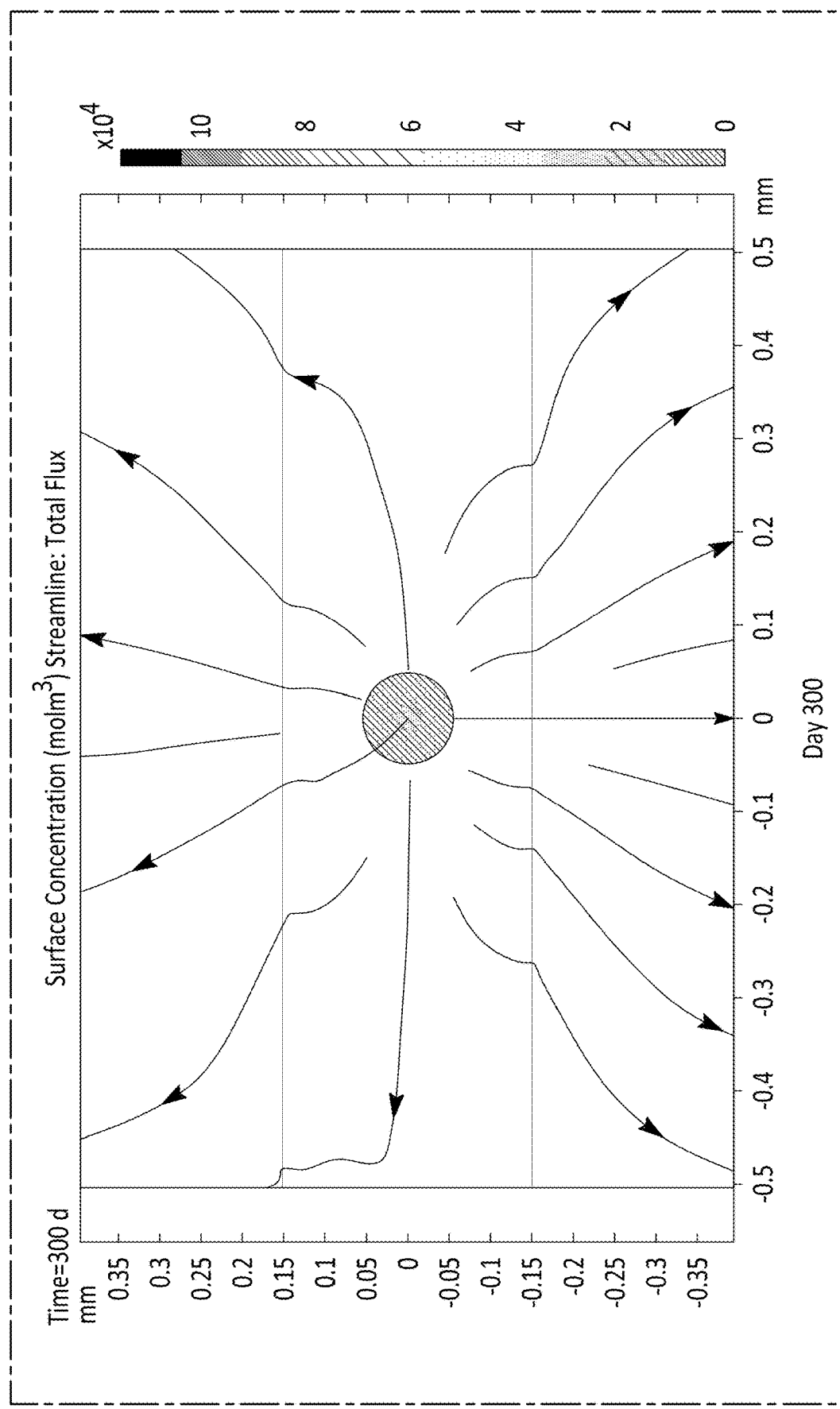
Figure 10B:
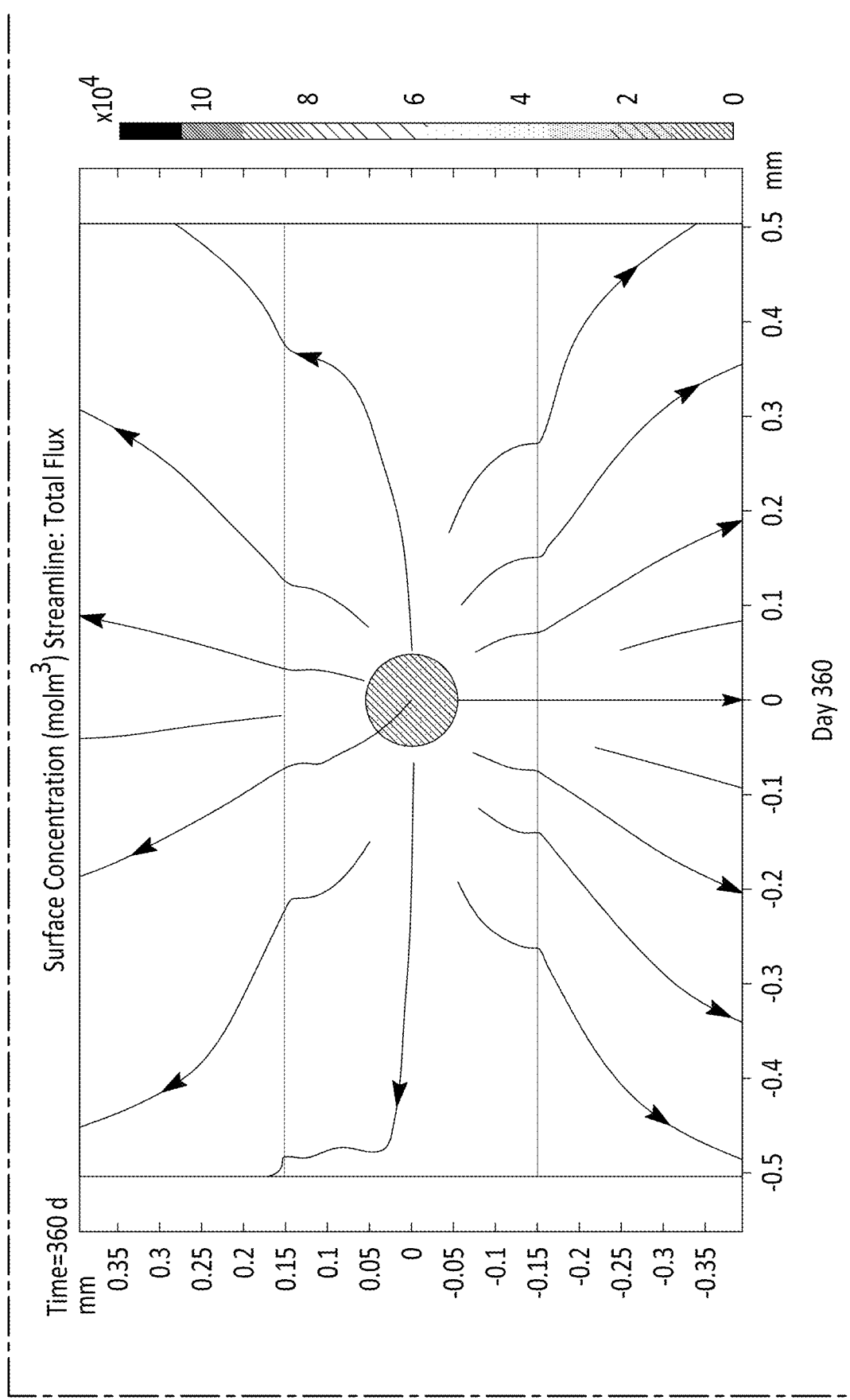

In various embodiments, a concentration of the spermicide 504 can be maintained within the polymer barrier 400 for about one year (see, FIGS. 10A and 10B). That is, FIGS. 10A and 10B show the concentration of one embodiment of a spermicide 504 in a polymer barrier 400 over the course of about one year.

The polymer solution 500 may include any suitable amount of the spermicide 504 that can incapacitate sperm 20. In certain embodiments, the amount of the spermicide 504 in the polymer solution 500 includes a concentration of about $4.6761e^{-7}$ mol/m$^3$, among other greater concentrations or smaller concentrations of the spermicide 504 that are possible, each of which is contemplated herein (see, FIGS. 10A and 10B).

Figure 6:
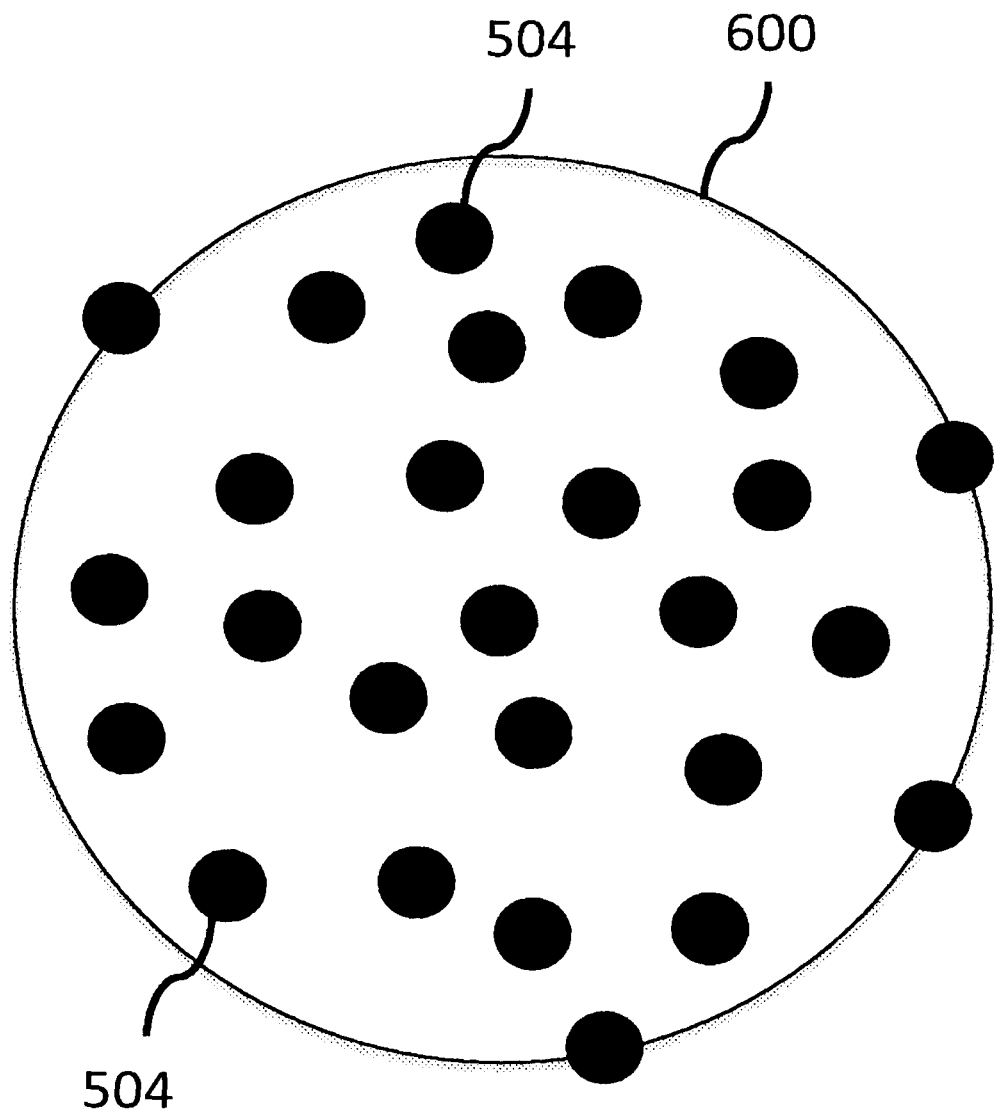
FIG. 6 is a schematic diagram illustrating one embodiment of a particle housing a spermicide included in the polymer barrier of FIG. 4.

In certain embodiments, the spermicide 504 is housed and/or stored in a plurality of particles 600 that can be included/dispersed in the polymer solution 500, as illustrated in FIG. 6. The particles 600 are configured to encapsulate the spermicide 504 so that the spermicide can interact with any sperm 20 that come into contact with the polymer barrier 400 to incapacitate the sperm 20.

FIG. 6 illustrates one embodiment of a particle 600 including the spermicide 504. A particle 600 may be composed of any suitable material capable of housing the spermicide 504. In various embodiments, the particle 600 includes a polymer and/or a biocompatible polymer. In certain embodiments, the microparticle 600 includes poly-L-lactic acid (PLLA) and/or poly (lactic-co-glycolic acid) (PLGA), among other polymers that are possible, each of which is contemplated herein.

A particle 600 may include any suitable size and/or shape capable of housing the spermicide 504. In certain embodiments, the particle 600 includes a size in the micro- ($10^{-6}$ meters) and/or nano- ($10^{-9}$ meters) scales, among other larger and/or smaller sizes that are possible, each of which is contemplated herein.

Figure 7:
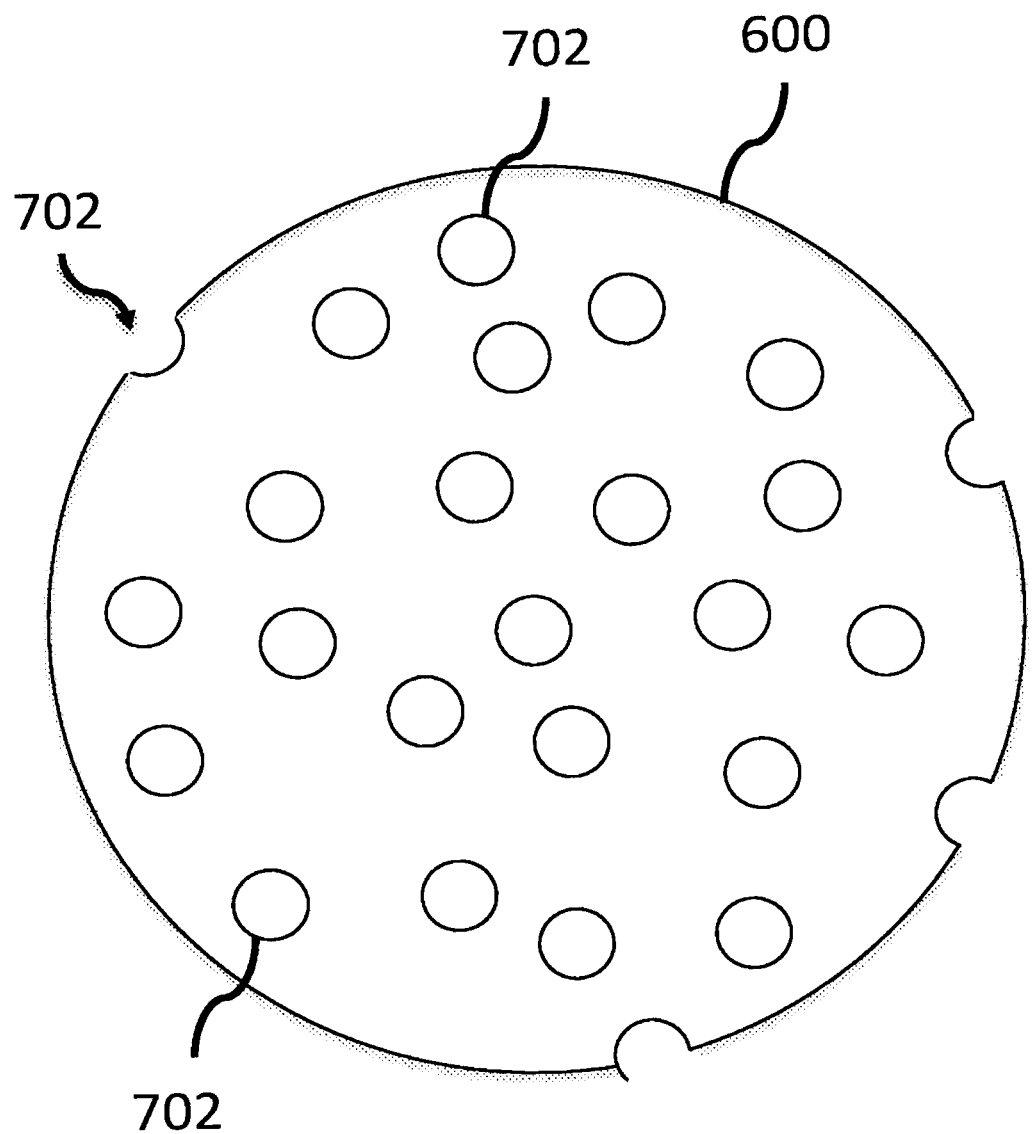
FIG. 7 is a schematic diagram illustrating one embodiment of the particle of FIG. 6 showing a plurality of pores for encapsulating the spermicide.

As shown in FIG. 7, the microparticle 600 includes plurality of pores 702 configured to encapsulate the spermicide 504. The pores 702 may include any suitable size and/or shape that can enable/allow the spermicide to reside therein.

In certain embodiments, the pores 702 include a size and/or gaps of about five nanometers (5 nm). The pores 702 can be filled with the spermicide 504 through physical bonding and/or chemical bonding to encapsulate the spermicide 504 for an efficacy period of up to one year (see, FIGS. 10A and 10B).

Referring again to FIG. 5, a polymer solution 500 including a polymer 502 and a spermicide 504 is provided to a hypodermic needle for injection into a male subject's vas deferens 30. The needle may include any size needle capable is delivering the polymer solution 500 to the vas deferens 30.

To create the polymer barrier 400 in the vas deferens 30 using the polymer solution 500, a male subject is prepared by administering a local anesthetic. An incision is made in the male subject's scrotum and the male subject's vas deferens 30 is identified and isolated. The needle is attached to an angiocatheter and inserted at an angle (e.g., an upward angle) in which a saline flush method can be used to confirm that the needle is inserted at the correct depth in the vas deferens 30. Leaving the needle in place, the saline syringe is detached and replaced with a contraceptive syringe including a pre-filled amount of the polymer solution 500 and the polymer solution 500 is dispensed into the vas deferens 30.

The needle is removed (e.g., pulled out) and the vas deferens 30 is allowed to recede back into the scrotum. The procedure is repeated on the male subject's second vas deferens 30. In this manner, a polymer barrier 400 including spermicide 504 is created in each vas deferens 30 of the male subject.

Over time, the male subject metabolizes the polymer barrier 400, polymer 502, and/or spermicide 504, which can enable and/or allow sperm 20 to flow through and/or out of the vas deferens 30. The amount of time to metabolize the polymer barrier 400, polymer 502, and/or spermicide 504 can vary depending upon the individual. In various embodiments, the polymer barrier 400, polymer 502, and/or spermicide 504 can remain effective in blocking and/or incapacitating sperm 20 for at least one year and up to about two years.

Figure 8:
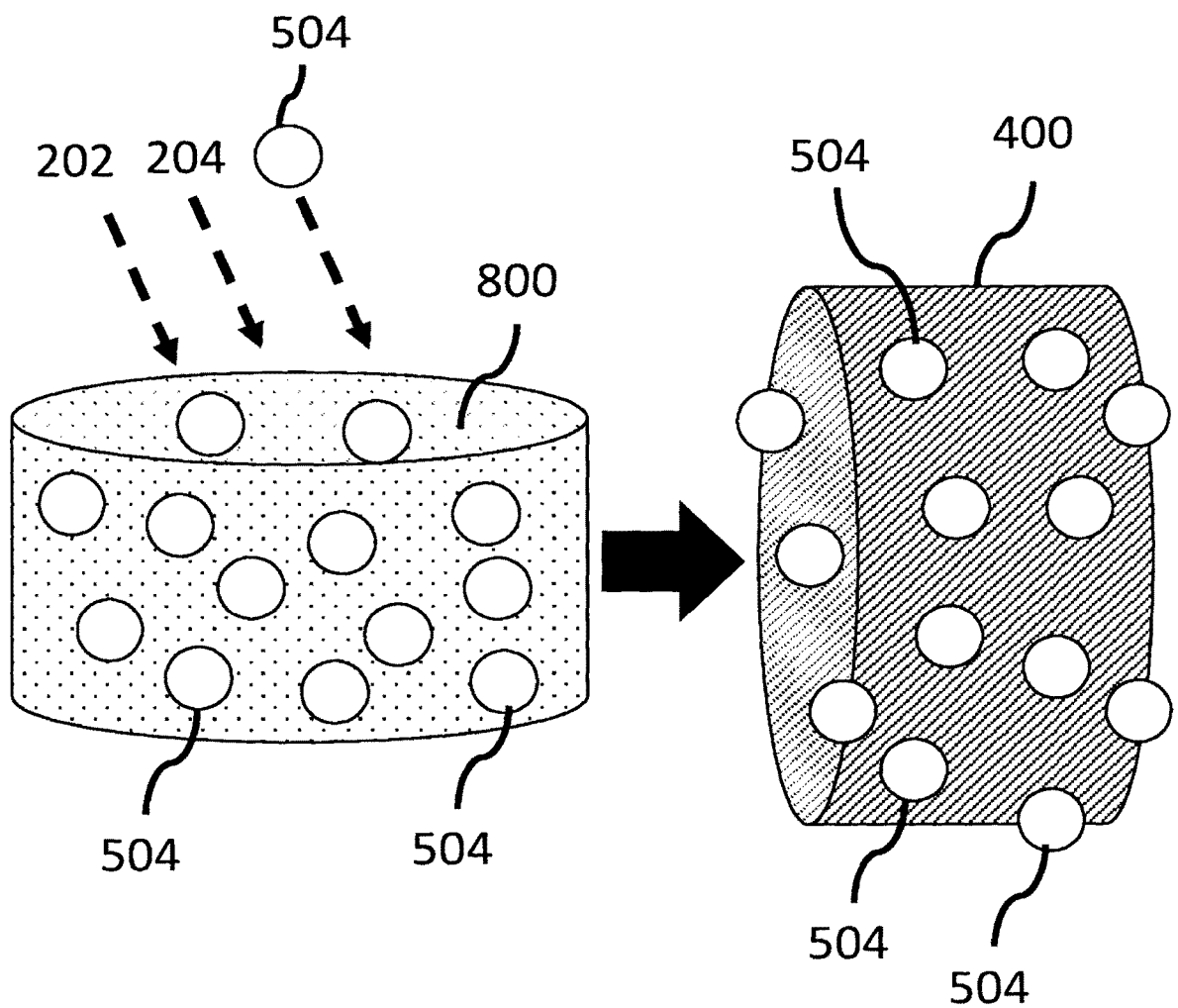
FIG. 8 is a schematic diagram of another embodiment of a polymer solution including a spermicide that can be inserted in the vas deferens of a male subject to form the polymer barrier including spermicide of FIG. 4.

FIG. 8 is a schematic diagram of another embodiment of a polymer solution 800 that can form a polymer barrier 400 (see, FIG. 4) including a spermicide to physically block or at least partially block sperm 20 in the vas deferens 30 of a male subject and/or incapacitate sperm 20 in the vas deferens 30. In various embodiments, a first portion of the polymer solution 800 includes a polymer 202, a second portion of the polymer solution 800 includes a thinning agent 204, and a third portion of the polymer solution 800 includes a spermicide 504.

The polymer 202 may include any of the embodiments of the polymer 202 included in the polymer solution 200 discussed with reference to FIG. 2. The thinning agent 204 may include any of the embodiments of the thinning agent 204 included in the polymer solution 200 discussed with reference to FIG. 2. The spermicide 504 may include any of the embodiments of the spermicide 504 included in the polymer solution 500 discussed with reference to FIG. 5.

To create the polymer barrier 400 in the vas deferens 30 using the polymer solution 800, the polymer solution 800 is provided to a small gauge needle (e.g., a 27-gauge needle or smaller). The thinning agent 204 acts upon the polymer 202 housing the spermicide 504 to decrease the viscosity of the polymer 202 and/or the polymer solution 800.

To insert the polymer solution 800, a male subject is prepared by administering a local anesthetic. A small incision is made in the male subject's scrotum and the male subject's vas deferens 30 is identified and isolated. The needle is attached to an angiocatheter and inserted at an angle (e.g., an upward angle) in which a saline flush method can be used to confirm that the needle is inserted at the correct depth in the vas deferens 30. Leaving the needle in place, the saline syringe is detached and replaced with a contraceptive syringe including a pre-filled amount of the polymer solution 800 and the polymer solution 800 is dispensed into the vas deferens 30.

The needle is removed (e.g., pulled out) and the vas deferens 30 is allowed to recede back into the scrotum. The procedure is repeated on the male subject's second vas deferens 30. No stitches are needed due to the small puncture hole and the small incision can heal on its own. Once in the vas deferens 30, the thinning agent 204 (e.g., GdL, etc.) is metabolized by the male subject, which increases the viscosity of the polymer 202 and/or returns the polymer 202 to its original and/or natural viscosity forming the polymer barrier 400 in the vas deferens 30.

Over time, the male subject metabolizes the polymer barrier 400, the polymer 202, and/or the spermicide 504 which can enable and/or allow sperm 20 to flow through and/or out of the previously blocked/occulated vas deferens 30. The amount of time to metabolize the polymer barrier 400, the polymer 202, and/or the spermicide 504 can vary depending upon the individual. In various embodiments, the polymer barrier 400 and/or the spermicide 504 can remain effective for at least one year and up to two years.

Figure 9:
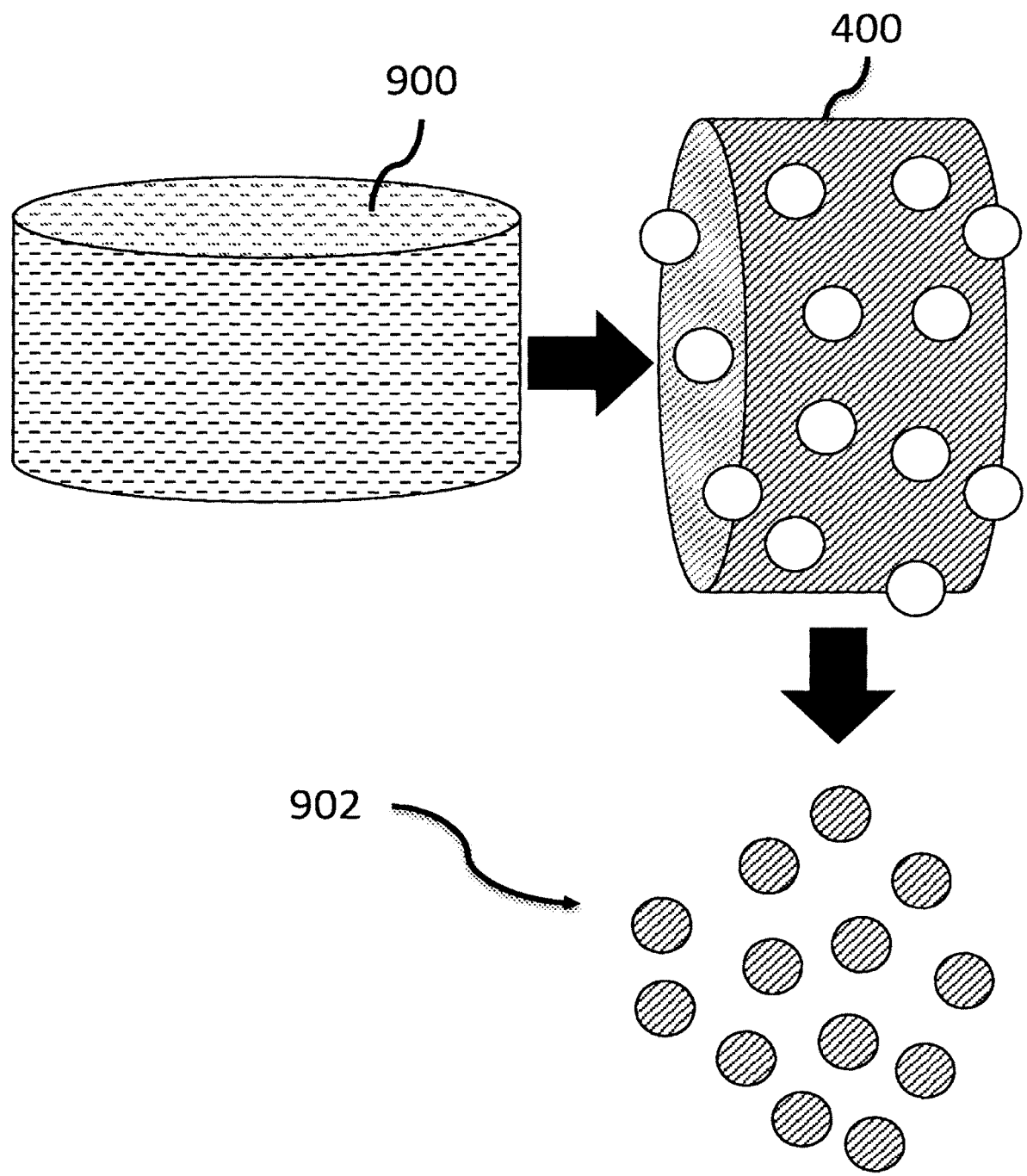
FIG. 9 is a schematic diagram one embodiment of a calcium chelator that can degrade the polymer barrier of FIG. 4.

FIG. 9 is a schematic diagram of one embodiment of a calcium chelator 900 for degrading a polymer barrier 400 and/or spermicide 504. The calcium chelator 900 may include any suitable solution(s) and/or substance(s) that is/are capable of degrading, dissolving, and/or breaking down the polymer barrier 400 and/or spermicide 504. In certain embodiments, the calcium chelator 900 includes ethylenediaminetetra-acetic acid (EDTA), among other solution(s) and/or substance(s) that is/are possible, each of which is contemplated herein.

At a desired time, the calcium chelator 900 may be injected/added to the site of the polymer barrier 400 to degrade the polymer 202 and/or spermicide 504. The calcium chelator 900 acts on the polymer 202 and/or spermicide 504 to degrade/break down the polymer barrier 400 into particles 902 of polymer 202 and/or spermicide 504, which can allow the particles 902 to be flushed from the vas deferens 30.

The calcium chelator 900 may be injected into the vas deferens 30 and/or polymer barrier 400 using any sized needle. In various embodiments, the calcium chelator 900 can be injected using a 27-gauge or smaller needle.

The amount of the calcium chelator 900 that is injected into the vas deferens 30 and/or polymer barrier 400 can be any suitable amount that can degrade the polymer 202 and/or spermicide 504 in the vas deferens 30 sufficient to unblock the outflow of sperm 20. In various embodiments, the amount of the calcium chelator 900 that is injected into the vas deferens 30 and/or polymer barrier 900 is in the range of about 2 g to about 5 g by weight and/or 2 ml/cc to about 5 mL/cc by volume, among other ranges and/or amounts of the calcium chelator 300 that are possible, each of which is contemplated herein. In certain embodiments, the amount of the calcium chelator 900 that is injected into the vas deferens 30 and/or polymer barrier 400 is about 2 g by weight and/or 2 mL/cc by volume, among other amounts by weight and/or volume that are possible, each of which is contemplated herein.

To insert the calcium chelator 900, a male subject is prepared by administering a local anesthetic. A small incision is made in the male subject's scrotum and the male subject's vas deferens 30 is identified and isolated. The location and/or site of the polymer barrier 400 is identified and isolated.

The needle is attached to an angiocatheter and inserted at an angle (e.g., an upward angle) in which a saline flush method can be used to confirm that the needle is inserted at the correct depth in the vas deferens 30. Leaving the needle in place, the saline syringe is detached and replaced with a syringe including a pre-filled amount of the calcium chelator 900 and the calcium chelator 900 is dispensed into the vas deferens 30 and/or polymer barrier 400 and is subsequently flushed with a saline solution, similar to other embodiments discussed elsewhere herein.

The needle is removed (e.g., pulled out) and the vas deferens 30 is allowed to recede back into the scrotum. The procedure is repeated on the other polymer barrier 400 in the male subject's second vas deferens 30. No stitches are needed due to the small puncture hole and the small incision can heal on its own.

After the polymer barrier 400 and/or spermicide 504 is/are sufficiently degraded, sperm 20 are no longer blocked and are able to flow through the vas deferens 30. Here, because the polymer barrier 400 and spermicide 504 can be degraded at will, this form of male birth control is considered temporary and/or reversible.

Figure 11:
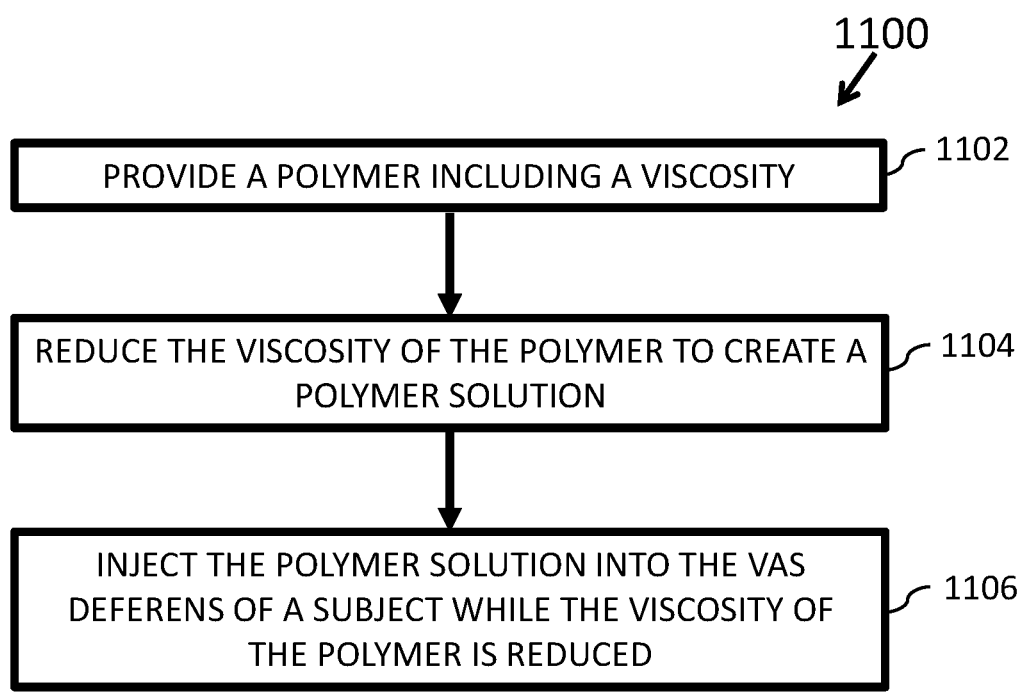
FIGS. 11-20 a schematic flow diagrams of various methods of reversible male birth control.

FIG. 11 is a block diagram of one embodiment of a method 1100 for male birth control. At least in the illustrated embodiment, the method 1100 can begin by providing a polymer 202 including a viscosity (block 1102). In various embodiments, providing the polymer 202 includes providing a biocompatible polymer, providing a polysaccharide, providing an alginate and/or providing sodium alginate.

The method 1100 further includes reducing the viscosity of the polymer 202 to create a polymer solution 200 (block 1104). In various embodiments, the viscosity of the polymer 202 is reduced and/or the polymer solution 200 is created by mixing and/or adding a thinning agent 204 (e.g., GdL) to the polymer 202.

The polymer solution 200 is injected into the vas deferens 30 of a male subject while the viscosity of the polymer 202 is reduced (block 1106). In various embodiments, the polymer solution 200 forms a polymer barrier 10 for sperm subsequent to being injected into the vas deferens 30. The method 1100 can provide temporary and/or reversible male birth control.

Figure 12:
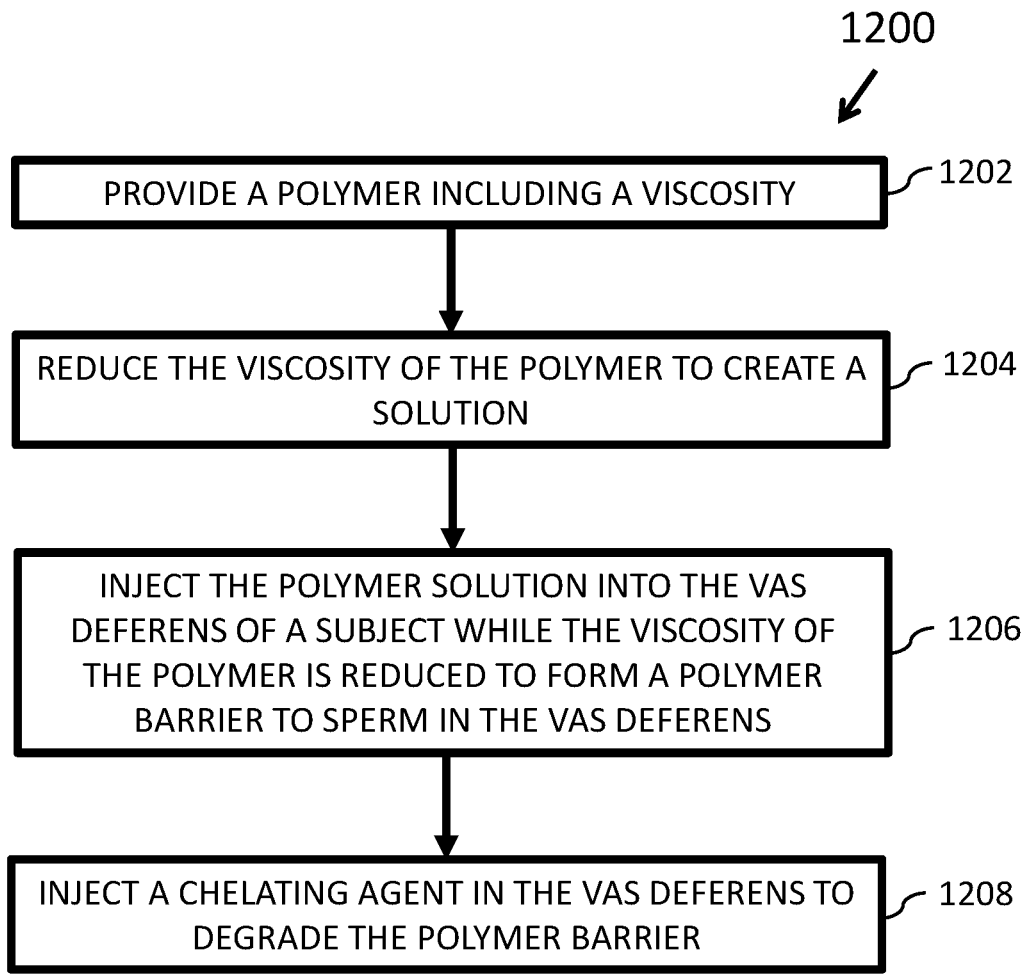

FIG. 12 is a block diagram of another embodiment of a method 1200 for male birth control. At least in the illustrated embodiment, the method 1200 can begin by providing a polymer 202 including a viscosity (block 1202). In various embodiments, providing the polymer 202 includes providing a biocompatible polymer, providing a polysaccharide, providing an alginate and/or providing sodium alginate.

The method 1200 further includes reducing the viscosity of the polymer 202 to create a polymer solution 200 (block 1204). In various embodiments, the viscosity of the polymer 202 is reduced and/or the polymer solution 200 is created by mixing and/or adding a thinning agent 204 (e.g., GdL) to the polymer 202.

The polymer solution 200, 800 is injected into the vas deferens 30 of a male subject while the viscosity of the polymer 202 is reduced (block 1206). In various embodiments, the polymer solution 200 forms a polymer barrier 10 for sperm subsequent to being injected into the vas deferens 30.

A calcium chelator 300 (e.g., EDTA) is injected into the vas deferens 30 to degrade the polymer barrier 10 (block 1208). The calcium chelator 300 can be injected using any sized needles and, in some embodiments, using a 27-gauge or smaller needle. In various embodiments, the method 1200 can provide temporary and/or reversible male birth control.

Figure 13:
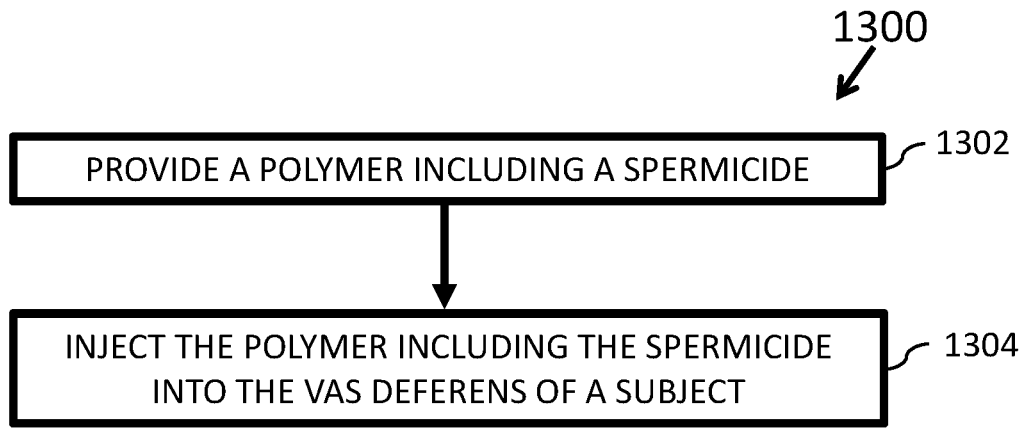

FIG. 13 is a block diagram of a further embodiment of a method 1300 for male birth control. At least in the illustrated embodiment, the method 1300 can begin by providing a polymer 502 and a spermicide 504 to form a polymer solution 500 (block 1302).

In various embodiments, providing the polymer 502 includes providing a biocompatible polymer, providing a polysaccharide, providing an alginate and/or providing sodium alginate. Further, the spermicide 504 can include a calcium channel blocker and/or nifedipine, as discussed elsewhere herein.

The polymer solution 500 including the polymer 502 and spermicide 504 is injected into the vas deferens 30 of a male subject (block 1304). In various embodiments, the polymer solution 500 can form a polymer barrier 400 subsequent to being injected into the vas deferens 30. The method 1300 can provide temporary and/or reversible male birth control.

Figure 14:
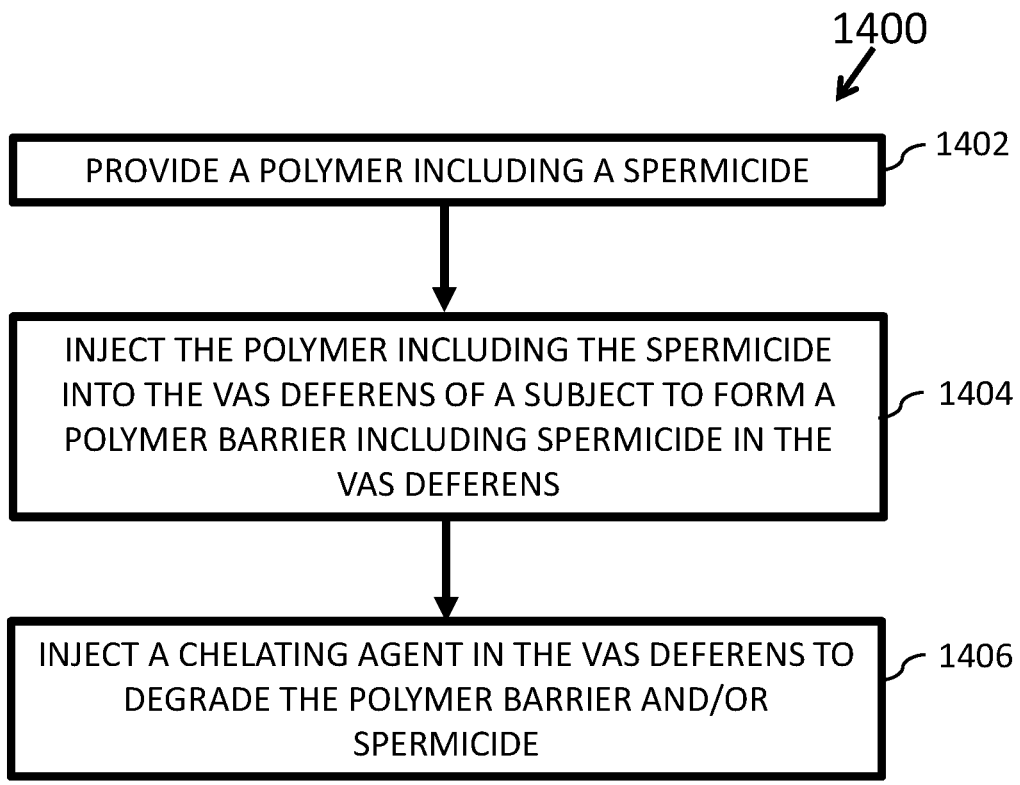

FIG. 14 is a block diagram of another embodiment of a method 1400 for male birth control. At least in the illustrated embodiment, the method 1400 can begin by providing a polymer 502 and a spermicide 504 to form a polymer solution 500 (block 1402).

In various embodiments, providing the polymer 502 includes providing a biocompatible polymer, providing a polysaccharide, providing an alginate and/or providing sodium alginate. Further, the spermicide 504 can include a calcium channel blocker and/or nifedipine, as discussed elsewhere herein.

The polymer solution 500 including the polymer 502 and spermicide 504 is injected into the vas deferens 30 of a male subject (block 1404). In various embodiments, the polymer solution 500 can form a polymer barrier 400 subsequent to being injected into the vas deferens 30.

A calcium chelator 900 (e.g., EDTA) can be injected into the vas deferens 30 to degrade the polymer 502 and/or spermicide 504 (block 1406). The method 1400 can provide temporary and/or reversible male birth control.

Figure 15:
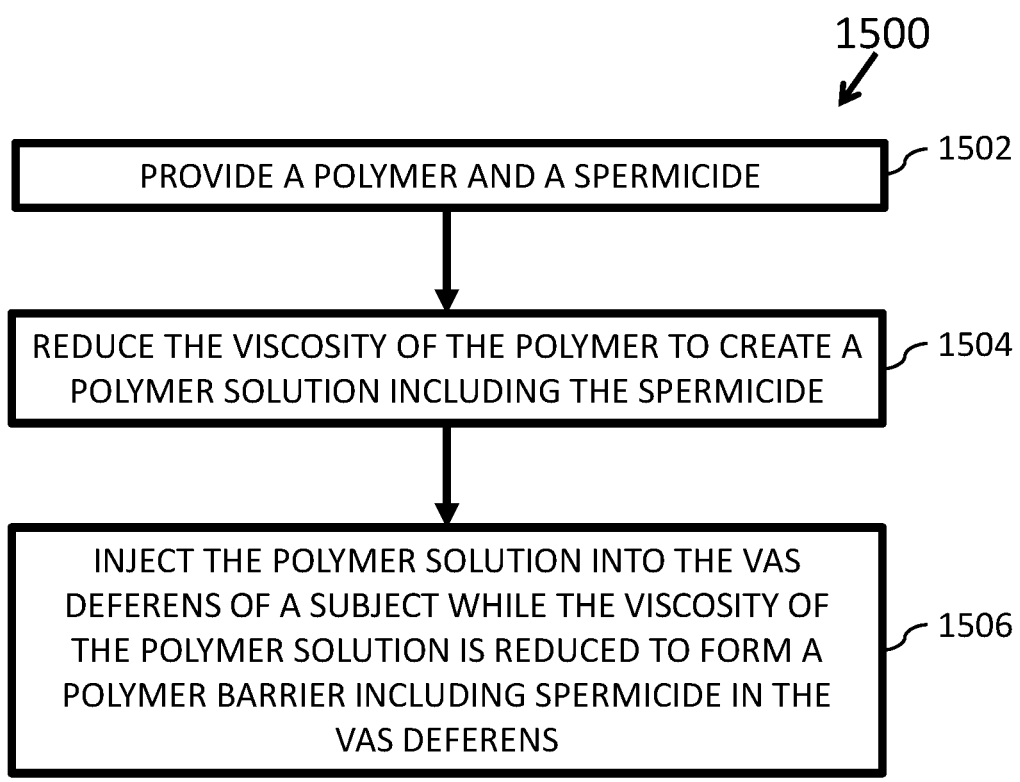

FIG. 15 is a block diagram of an additional embodiment of a method 1500 for male birth control. At least in the illustrated embodiment, the method 1500 can begin by providing a polymer 202 and a spermicide 504 (block 1502).

In various embodiments, providing the polymer 202 includes providing a biocompatible polymer, providing a polysaccharide, providing an alginate and/or providing sodium alginate. Further, the spermicide 504 can include a calcium channel blocker and/or nifedipine, as discussed elsewhere herein.

The method 1500 further includes reducing the viscosity of the polymer 202 to create a polymer solution 800 (block 1504). In various embodiments, the viscosity of the polymer 202 is reduced and/or the polymer solution 800 is created by mixing and/or adding a thinning agent 204 (e.g., GdL) to the polymer 202.

The polymer solution 800 is injected into the vas deferens 30 of a male subject while the viscosity of the polymer 202 is reduced (block 1506). In various embodiments, the polymer solution 800 forms a polymer barrier 400 for sperm subsequent to being injected into the vas deferens 30. The method 1500 can provide temporary and/or reversible male birth control.

Figure 16:
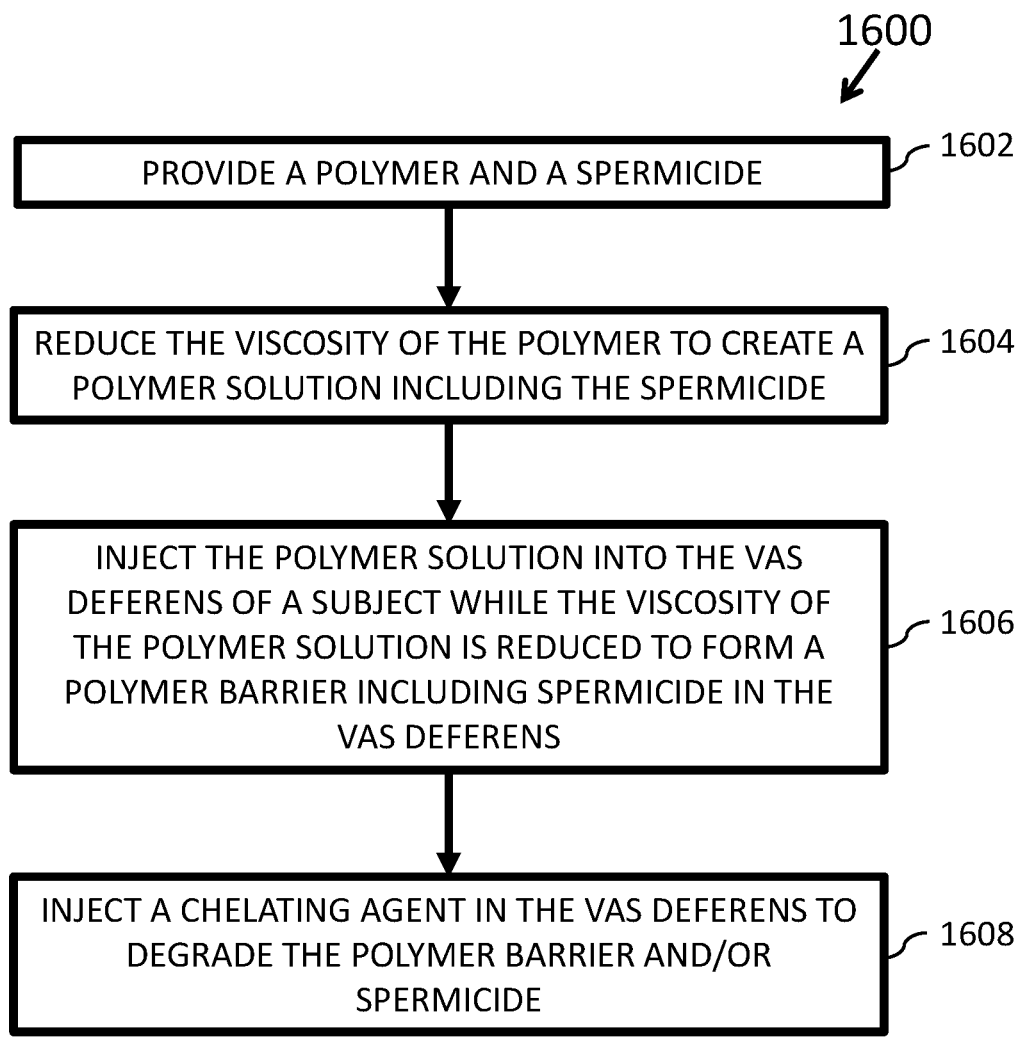

FIG. 16 is a block diagram of an additional embodiment of a method 1600 for male birth control. At least in the illustrated embodiment, the method 1600 can begin by providing a polymer 202 and a spermicide 504 (block 1602).

In various embodiments, providing the polymer 202 includes providing a biocompatible polymer, providing a polysaccharide, providing an alginate and/or providing sodium alginate. Further, the spermicide 504 can include a calcium channel blocker and/or nifedipine, as discussed elsewhere herein.

The method 1600 further includes reducing the viscosity of the polymer 202 to create a polymer solution 800 (block 1604). In various embodiments, the viscosity of the polymer 202 is reduced and/or the polymer solution 800 is created by mixing and/or adding a thinning agent 204 (e.g., GdL) to the polymer 202.

The polymer solution 800 is injected into the vas deferens 30 of a male subject while the viscosity of the polymer 202 is reduced (block 1606). In various embodiments, the polymer solution 800 forms a polymer barrier 400 for sperm subsequent to being injected into the vas deferens 30.

A calcium chelator 900 (e.g., EDTA) can be injected into the vas deferens 30 to degrade the polymer 502 and/or spermicide 504 (block 1606). The method 1600 can provide temporary and/or reversible male birth control.

Figure 17:
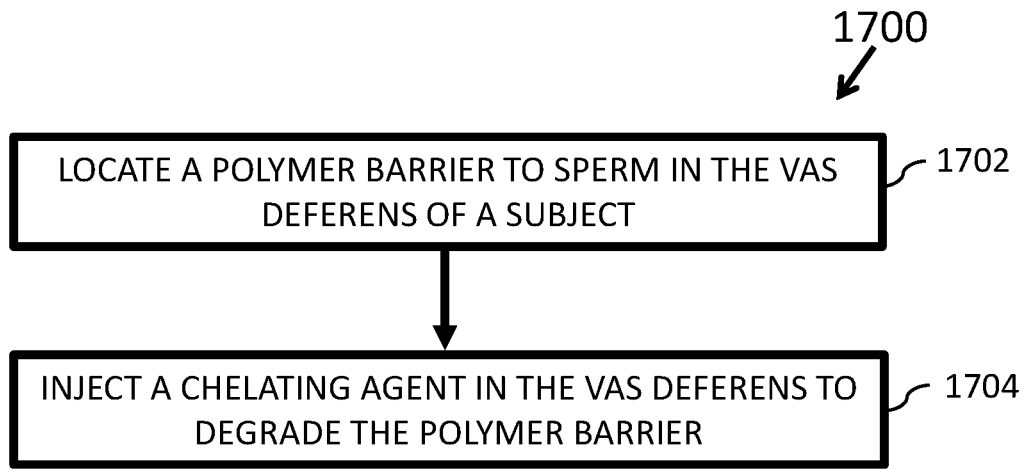

FIG. 17 is a block diagram of another embodiment of a method 1700 for male birth control. At least in the illustrated embodiment, the method 1700 can begin by locating a polymer barrier 10 in the vas deferens 30 of a male subject (block 1702).

The polymer barrier 400 may be located using any suitable method and/or technique that is known or developed in the future capable of locating a substance in the vas deferens 30. In some embodiments, the polymer barrier 400 includes a dye (e.g., a fluorescent dye (e.g., indocyanine green (ICG), etc.), etc.) and visual imaging can be used to locate the polymer barrier 400 via the dye in the polymer barrier 400. In additional or alternative embodiments, the polymer barrier 400 is located using ultrasound.

A calcium chelator 300 can be injected into the vas deferens 30 to degrade the polymer barrier 10 (block 1704). The calcium chelator 300 in various embodiments can include EDTA, among other calcium chelators that are possible, each of which is contemplated herein.

Figure 18:
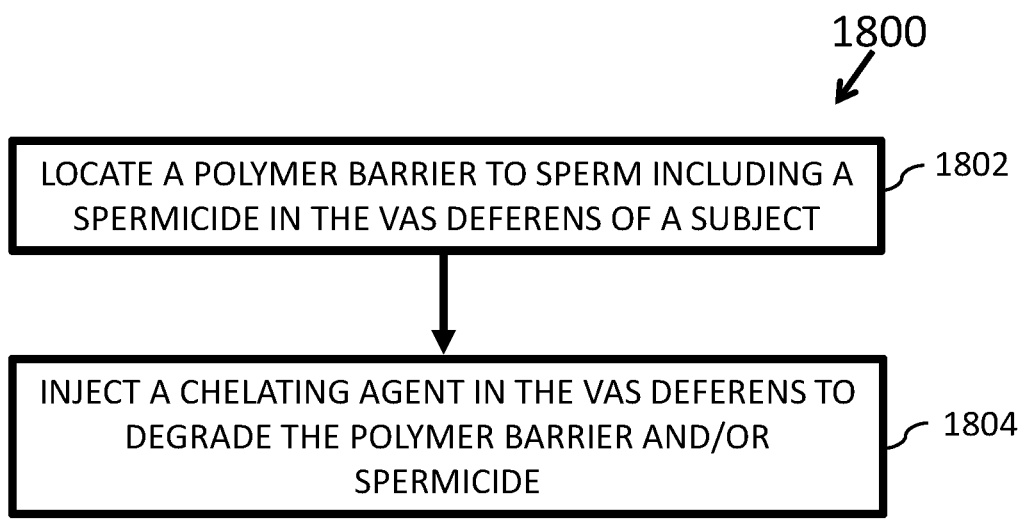

FIG. 18 is a block diagram of yet another embodiment of a method 1800 for male birth control. At least in the illustrated embodiment, the method 1800 can begin by locating a polymer barrier 400 in the vas deferens 30 of a male subject (block 1802).

The polymer barrier 400 may be located using any suitable method and/or technique that is known or developed in the future capable of locating a substance in the vas deferens 30. In some embodiments, the polymer barrier 400 includes a dye (e.g., a fluorescent dye (e.g., indocyanine green (ICG), etc.), etc.) and visual imaging can be used to locate the polymer barrier 400 via the dye in the polymer barrier 400. In additional or alternative embodiments, the polymer barrier 400 is located using ultrasound.

A calcium chelator 900 can be injected into the vas deferens 30 to degrade the polymer barrier 400 and/or spermicide 504 (block 1804). The calcium chelator 900 in various embodiments can include EDTA, among other calcium chelators that are possible, each of which is contemplated herein.

Figure 19:
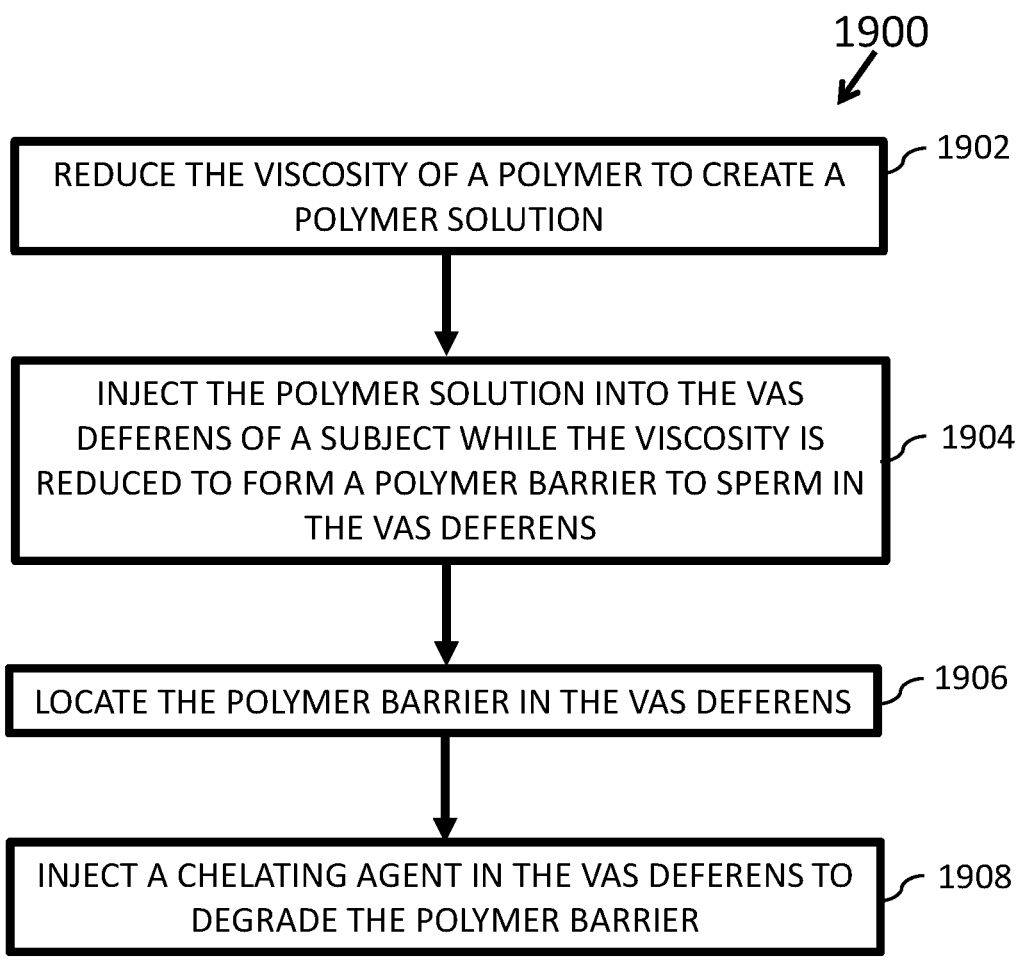

FIG. 19 is a block diagram of a further embodiment of a method 1900 for male birth control. At least in the illustrated embodiment, the method 1900 can begin by reducing the viscosity of a polymer 202 to create a polymer solution 200 (block 1902).

The polymer 202 can include a biocompatible polymer, a polysaccharide, an alginate and/or sodium alginate, as discussed elsewhere herein. In various embodiments, the viscosity of the polymer 202 is reduced and/or the polymer solution 200 is created by mixing and/or adding a thinning agent 204 (e.g., GdL) to the polymer 202.

The polymer solution 200 is injected into the vas deferens 30 of a male subject while the viscosity of the polymer 202 is reduced (block 1904). In various embodiments, the polymer solution 200 forms a polymer barrier 10 for sperm subsequent to being injected into the vas deferens 30.

The polymer barrier 10 is located in the vas deferens 30 (block 1906) and a calcium chelator 300 (e.g., EDTA) can be injected into the vas deferens 30 to degrade the polymer barrier 10 (block 1908). The method 1900 can provide temporary and/or reversible male birth control.

Figure 20:
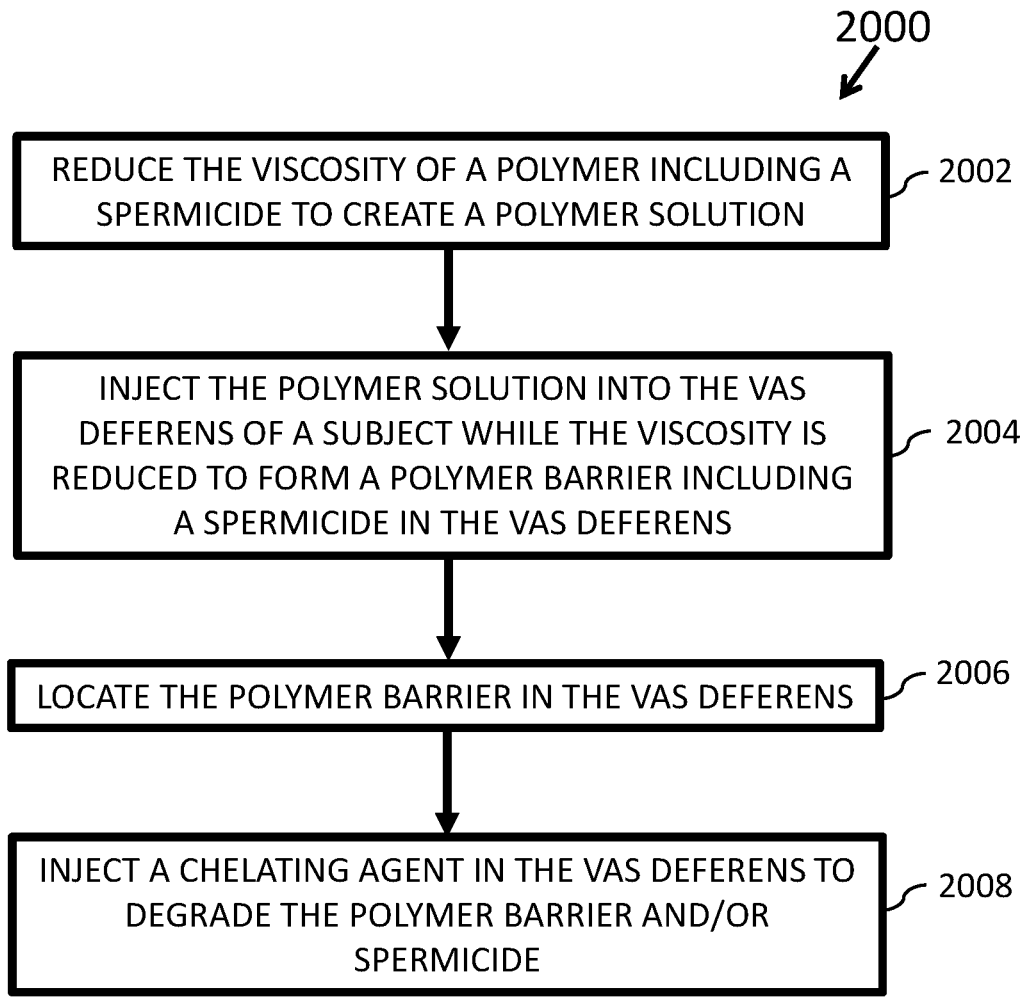

FIG. 20 is a block diagram of an embodiment of a method 2000 for male birth control. At least in the illustrated embodiment, the method 2000 can begin by reducing the viscosity of a polymer 202 including a spermicide 504 to create a polymer solution 800 (block 2002).

The polymer 202 can include a biocompatible polymer, a polysaccharide, an alginate and/or sodium alginate, as discussed elsewhere herein. Further, the spermicide 504 can include a calcium channel blocker and/or nifedipine, as discussed elsewhere herein. In various embodiments, the viscosity of the polymer 202 is reduced and/or the polymer solution 800 is created by mixing and/or adding a thinning agent 204 (e.g., GdL) to the polymer 202.

The polymer solution 800 is injected into the vas deferens 30 of a male subject while the viscosity of the polymer 202 is reduced (block 1904). In various embodiments, the polymer solution 800 forms a polymer barrier 400 for sperm subsequent to being injected into the vas deferens 30.

The polymer barrier 400 is located in the vas deferens 30 (block 2006) and a calcium chelator 900 (e.g., EDTA) can be injected into the vas deferens 30 to degrade the polymer barrier 400 and/or spermicide 504 (block 2008). The method 2000 can provide temporary and/or reversible male birth control.

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

Furthermore, the described features, structures, or characteristics of the embodiments may be combined in any suitable manner. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described above with reference to schematic flowchart diagrams and/or schematic block diagrams of particles (e.g., silver particles 100) and methods according to various embodiments. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment.

The description of elements in each figure may refer to elements of proceeding figures. Like numbers refer to like elements in all figures, including alternate embodiments of like elements.

The various disclosed embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
providing a polymer;
adding a thinning agent to the polymer to create a polymer solution of the polymer with a temporarily reduced viscosity prior to injecting the polymer solution into a subject, wherein the polymer solution includes a ratio of the polymer to the thinning agent in a range of 10:1 to 1:1;
performing a single injection into a vas deferens of the subject, wherein:

the single injection comprises injecting the polymer solution into the vas deferens of the subject while the viscosity of the polymer is temporarily reduced, and the thinning agent of the polymer solution is configured to be metabolized by the subject, and the polymer of the polymer solution remains in the vas deferens after the thinning agent is metabolized to form a polymer barrier for sperm in the vas deferens to render the subject temporarily infertile after elapse of a first amount of time subsequent to the single injection into the vas deferens; and at a desired time after elapse of a second amount of time subsequent to formation of the polymer barrier in the vas deferens defining a contraception period of time, injecting a calcium chelator directly into the polymer barrier formed in the vas deferens to degrade the polymer barrier to reverse the temporary infertility of the subject at the desired time, wherein:

the calcium chelator is not injected into in the vas deferens prior to the desired time when reversal of the temporary infertility is desired, and the calcium chelator does not reside in the vas deferens during the contraception period of time.

2. The method of claim 1, wherein providing the polymer comprises providing a biocompatible polymer.

3. The method of claim 2, wherein providing the biocompatible polymer comprises providing a polysaccharide.

4. The method of claim 3, wherein providing the polysaccharide comprises providing an alginate.

5. The method of claim 4, wherein providing the alginate comprises providing sodium alginate.

6. The method of claim 1, wherein injecting the polymer solution into the vas deferens of the subject while the viscosity of the polymer is temporarily reduced comprises injecting the polymer solution into the vas deferens of the subject while the viscosity of the polymer is temporarily reduced via a hypodermic needle including a gauge having a size less than or equal to 27 gauge.

7. The method of claim 1, wherein the thinning agent comprises Glucono-delta-Lactone (GdL).

8. The method of claim 1, wherein the polymer solution forms the polymer barrier to sperm for at least one year.

9. The method of claim 1, wherein injecting the calcium chelator directly into the polymer barrier subsequent to formation of the polymer barrier in the vas deferens comprises injecting ethylenediaminetetra-acetic acid (EDTA) directly into the polymer barrier formed in the vas deferens.

10. The method of claim 9, wherein injecting the EDTA directly into the polymer barrier in the vas deferens comprises injecting the EDTA directly into the polymer barrier in the vas deferens via a hypodermic needle including a gauge having a size less than or equal to 27 gauge.

11. A method, comprising:

providing a polymer;

adding a thinning agent to the polymer to create a polymer solution of the polymer with a temporarily reduced viscosity prior to injecting the polymer solution into a subject, wherein the polymer solution includes a ratio of the polymer to the thinning agent in a range of 10:1 to 1:1;

performing a single injection into a vas deferens of the subject, wherein:

the single injection comprises injecting the polymer solution into the vas deferens of a subject while the viscosity of the polymer is temporarily reduced, and the thinning agent of the polymer solution is configured to be metabolized by the subject with the polymer of the polymer solution remaining in the vas deferens to create a polymer barrier to sperm in the vas deferens after elapse of a first amount of time subsequent to the single injection into the vas deferens to render the subject temporarily infertile;

at a desired time after elapse of a second amount of time subsequent to the polymer barrier being created in the vas deferens defining a contraception period of time, locating the polymer barrier in the vas deferens; and subsequent to locating the polymer barrier in the vas deferens, injecting a calcium chelator directly into the polymer barrier created in the vas deferens to degrade the polymer barrier and reverse the temporary infertility of the subject at the desired time, wherein:

the calcium chelator is not injected into in the vas deferens prior to the desired time when reversal of the temporary infertility is desired, and the calcium chelator does not reside in the vas deferens during the contraception period of time.

12. The method of claim 11, wherein:

the thinning agent comprises Glucono-delta-Lactone (GdL);

the polymer comprises sodium alginate; and the calcium chelator comprises ethylenediaminetetra-acetic acid (EDTA).

13. The method of claim 11, wherein injecting the polymer solution into the vas deferens of the subject while the viscosity of the polymer is temporarily reduced comprises injecting the polymer solution into the vas deferens of the subject while the viscosity of the polymer is temporarily reduced via a hypodermic needle including a gauge having a size less than or equal to 27 gauge.

14. The method of claim 11, wherein providing the polymer comprises providing a biocompatible polymer.

15. The method of claim 14, wherein providing the biocompatible polymer comprises providing a polysaccharide.

16. The method of claim 15, wherein providing the polysaccharide comprises providing an alginate.

17. The method of claim 16, wherein providing the alginate comprises providing sodium alginate.

18. The method of claim 11, wherein locating the polymer barrier in the vas deferens comprises using one of ultrasound or digital visual imaging to locate the polymer barrier in the vas deferens.

19. A method, comprising:

providing a polymer;

adding a thinning agent to the polymer to create a polymer solution of the polymer with a temporarily reduced viscosity prior to injecting the polymer solution into a subject, wherein the polymer solution includes a ratio of the polymer to the thinning agent in a range of 10:1 to 1:1; and performing only a first single injection into a vas deferens of the subject at a first time at which contraception is desired, the first single injection comprising injecting the polymer solution into the vas deferens of the subject while the viscosity of the polymer is temporarily reduced to create only a polymer barrier in the vas deferens of the subject, wherein:

the thinning agent of the polymer solution is configured to be metabolized by the subject, the polymer of the polymer solution remains in the vas deferens of the subject to form a polymer barrier for sperm in the vas deferens after elapse of a first amount of time to render the subject temporarily infertile for a contraception period of time subsequent to performing the first single injection, and the polymer barrier resides alone in the vas deferens during the contraception period of time.

20. The method of claim 19, further comprising:

at a second time at which fertility is desired after elapse of at least one year subsequent to the subject being rendered temporarily infertile by creation of the polymer barrier in the vas deferens, performing a second single injection into the vas deferens of the subject, wherein the second single injection comprises injecting a calcium chelator directly into the polymer barrier residing in the vas deferens to degrade the polymer barrier to reverse the infertility of the subject, wherein:

the calcium chelator is not injected into in the vas deferens prior to the desired time when reversal of the temporary infertility is desired, and the calcium chelator does not reside in the vas deferens during the contraception period of time.

\* \* \* \* \*